(12) United States Patent
Sawata et al.

(10) Patent No.: US 11,468,891 B2
(45) Date of Patent: Oct. 11, 2022

(54) INFORMATION PROCESSOR, INFORMATION PROCESSING METHOD, AND PROGRAM

(71) Applicant: Sony Corporation, Tokyo (JP)

(72) Inventors: Ryosuke Sawata, Kanagawa (JP); Yuichiro Koyama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 119 days.

(21) Appl. No.: 16/976,493

(22) PCT Filed: Feb. 21, 2019

(86) PCT No.: PCT/JP2019/006580
§ 371 (c)(1),
(2) Date: Aug. 28, 2020

(87) PCT Pub. No.: WO2019/187834
PCT Pub. Date: Oct. 3, 2019

(65) Prior Publication Data
US 2021/0050011 A1    Feb. 18, 2021

(30) Foreign Application Priority Data

Mar. 30, 2018  (JP) .............................. JP2018-069788

(51) Int. Cl.
*G10L 15/22* (2006.01)
*A63H 11/20* (2006.01)
(Continued)

(52) U.S. Cl.
CPC .............. *G10L 15/22* (2013.01); *A63H 11/20* (2013.01); *A63H 30/02* (2013.01); *G10L 15/083* (2013.01);
(Continued)

(58) Field of Classification Search
CPC ......... G10L 15/22; G10L 15/00; G10L 15/01; G10L 15/06; G10L 15/065; G10L 15/07;
(Continued)

(56) References Cited

U.S. PATENT DOCUMENTS

2005/0195989 A1* 9/2005 Sato ....................... B25J 13/003
381/94.1
2009/0210227 A1* 8/2009 Sugiyama ............... G10L 15/22
901/46

(Continued)

FOREIGN PATENT DOCUMENTS

JP    2002-140092 A    5/2002
JP    2004-130427 A    4/2004
(Continued)

OTHER PUBLICATIONS

International Search Report and Written Opinion dated May 21, 2019 for PCT/JP2019/006580 filed on Feb. 21, 2019, 10 pages including English Translation of the International Search Report.

*Primary Examiner* — Qi Han
(74) *Attorney, Agent, or Firm* — Xsensus LLP

(57) ABSTRACT

An information processor including: an operation control unit that controls a motion of an autonomous mobile body acting on the basis of recognition processing, in a case where a target sound that is a target voice for voice recognition processing is detected, the operation control unit moving the autonomous mobile body to a position, around an approach target, where an input level of a non-target sound that is not the target voice becomes lower, the approach target being determined on the basis of the target sound.

16 Claims, 24 Drawing Sheets

(51) Int. Cl.
*A63H 30/02* (2006.01)
*G10L 15/08* (2006.01)
*G10L 15/20* (2006.01)
*G10L 25/84* (2013.01)

(52) U.S. Cl.
CPC .............. *G10L 15/20* (2013.01); *G10L 25/84* (2013.01); *G10L 2015/223* (2013.01)

(58) Field of Classification Search
CPC ......... G10L 15/20; G10L 15/24; G10L 15/26; G10L 2015/0631–0638; G10L 2015/221–228
USPC .... 704/275, 270, 270.1, 272, 231, 244, 245, 704/246, 255
See application file for complete search history.

(56) References Cited

U.S. PATENT DOCUMENTS

2012/0130716 A1    5/2012  Kim
2019/0331522 A1*  10/2019  Celikel ................... G01M 1/22

FOREIGN PATENT DOCUMENTS

| JP | 2005-103679 A | 4/2005 |
| JP | 2006-181651 A | 7/2006 |
| JP | 2007-152443 A | 6/2007 |
| JP | 2007-164379 A | 6/2007 |
| JP | 2007-264472 A | 10/2007 |
| WO | 2017/169826 A1 | 10/2017 |

\* cited by examiner

FIG. 16

| GRASP OF SCHEDULE | DETECTION OF KEY SOUND | DETECTION OF DOOR OPENING/ CLOSING NOISE | DETECTION OF UTTERANCE SUCH AS "I'M HOME" | HUMAN DETECTION SENSOR | ... | EXECUTION |
|---|---|---|---|---|---|---|
| ✓ | ✓ | ✓ | ✓ | ✓ | ... | YES |
|  | ✓ | ✓ | ✓ | ✓ | ... | NO |
| ✓ |  | ✓ | ✓ | ✓ | ... | NO |
| ✓ | ✓ |  | ✓ | ✓ | ... | NO |
| ✓ | ✓ | ✓ |  | ✓ | ... | NO |
| ✓ | ✓ | ✓ | ✓ |  | ... | NO |
|  |  | ✓ | ✓ | ✓ | ... | NO |
|  | ✓ |  | ✓ | ✓ | ... | NO |
| ✓ | ✓ |  |  | ✓ | ... | NO |
| ✓ | ✓ |  | ✓ |  | ... | NO |
|  | ✓ | ✓ |  | ✓ | ... | NO |
| ✓ |  | ✓ | ✓ |  | ... | NO |
| ✓ | ✓ | ✓ |  |  | ... | NO |
|  |  |  | ✓ | ✓ | ... | NO |
|  | ✓ | ✓ | ✓ |  | ... | NO |
| ✓ |  | ✓ | ✓ |  | ... | NO |
| ... | ... | ... | ... | ... | ... | ... |

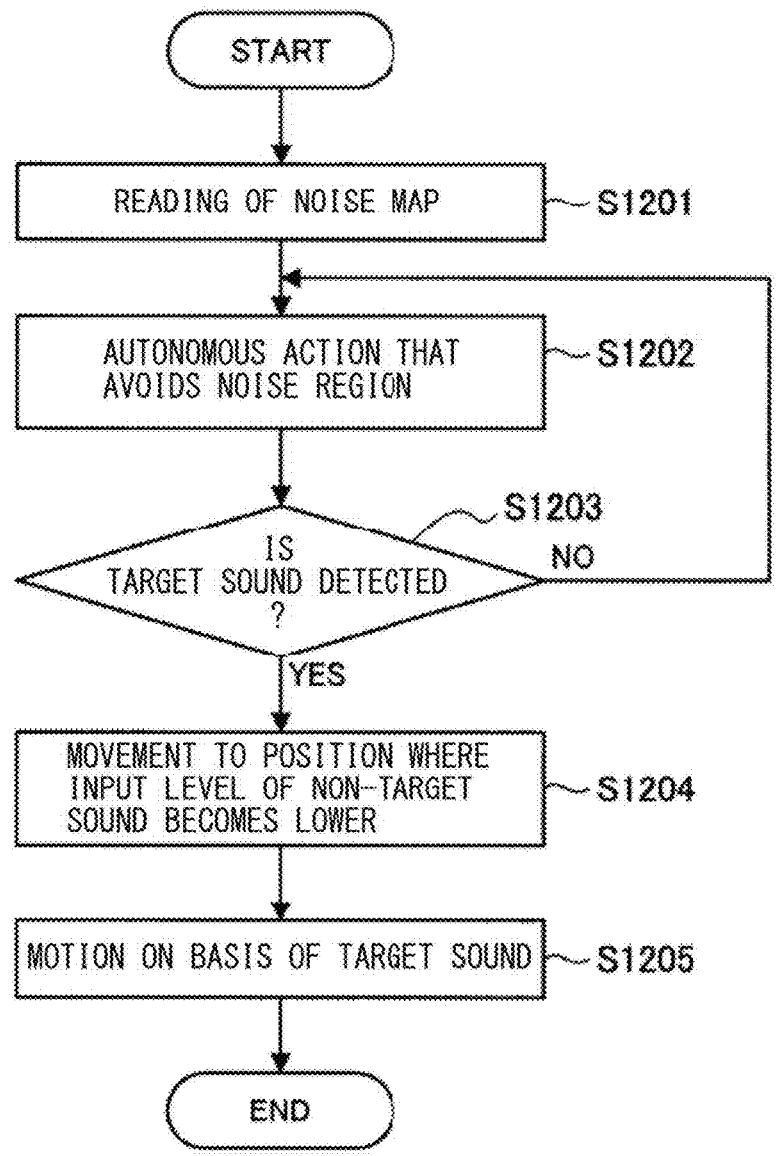

INFORMATION PROCESSOR, INFORMATION PROCESSING METHOD, AND PROGRAM

CROSS-REFERENCE TO RELATED APPLICATIONS

The present application is based on PCT filing PCT/JP2019/006580, filed Feb. 21, 2019, which claims priority to JP 2018-069788, filed Mar. 30, 2018, the entire contents of each are incorporated herein by reference.

TECHNICAL FIELD

The present disclosure relates to an information processor, an information processing method, and a program.

BACKGROUND ART

In recent years, various apparatuses have been developed that estimate a direction of a sound source such as an utterance of a user and execute a motion dependent on the direction of the sound source. Examples of the above-described apparatuses include an autonomous mobile body that executes autonomous movement on the basis of an estimated sound source direction. For example, PTL 1 discloses a technology for moving a robot device toward a direction where a utterance or a face of a user has been recognized.

CITATION LIST

Patent Literature

PTL 1: Japanese Unexamined Patent Application Publication No. 2004-130427

SUMMARY OF THE INVENTION

Problem to be Solved by the Invention

However, the technology described in PTL 1 does not consider existence of a sound other than the utterance of the user, i.e., noise. For this reason, in a case where the robot device is caused to simply make an approach to an estimated direction of the user, there is a possibility that an input level of the noise increases, thereby causing difficulty in recognition of the utterance of the user.

Therefore, the present disclosure proposes an information processor, an information processing method, and a program that are novel and improved, and make it possible to cause an autonomous mobile body to execute a motion for further improving accuracy of sound recognition.

Means for Solving the Problem

According to the present disclosure, there is provided an information processor including: an operation control unit that controls a motion of an autonomous mobile body acting on the basis of recognition processing, in a case where a target sound that is a target voice for voice recognition processing is detected, the operation control unit moving the autonomous mobile body to a position, around an approach target, where an input level of a non-target sound that is not the target voice becomes lower, the approach target being determined on the basis of the target sound.

In addition, according to the present disclosure, there is provided an information processing method including causing a processor to: control a motion of an autonomous mobile body acting on the basis of recognition processing, the controlling further including, in a case where a target sound that is a target voice for voice recognition processing is detected, moving the autonomous mobile body to a position, around an approach target, where an input level of a non-target sound that is not the target voice becomes lower, the approach target being determined on the basis of the target sound.

In addition, according to the present disclosure, there is provided a program that causes a computer to function as an information processor, the information processor including an operation control unit that controls a motion of an autonomous mobile body acting on the basis of recognition processing, in a case where a target sound that is a target voice for voice recognition processing is detected, the operation control unit moving the autonomous mobile body to a position, around an approach target, where an input level of a non-target sound that is not the target voice becomes lower, the approach target being determined on the basis of the target sound.

Effect of the Invention

As described above, according to the present disclosure, it is possible to cause the autonomous mobile body to execute a motion for further improving accuracy of sound recognition.

It is to be noted that above-described effects are not necessarily limitative; in addition to or in place of the above effects, there may be achieved any of the effects described in the present specification or other effects that may be grasped from the present specification.

BRIEF DESCRIPTION OF THE DRAWINGS

FIG. 16 is a setting example of execution conditions for noise map creation processing and updating processing according to the same embodiment.

FIG. 24 is a flowchart illustrating a flow of motion control according to the same embodiment.

MODES FOR CARRYING OUT THE INVENTION

Figure 1:
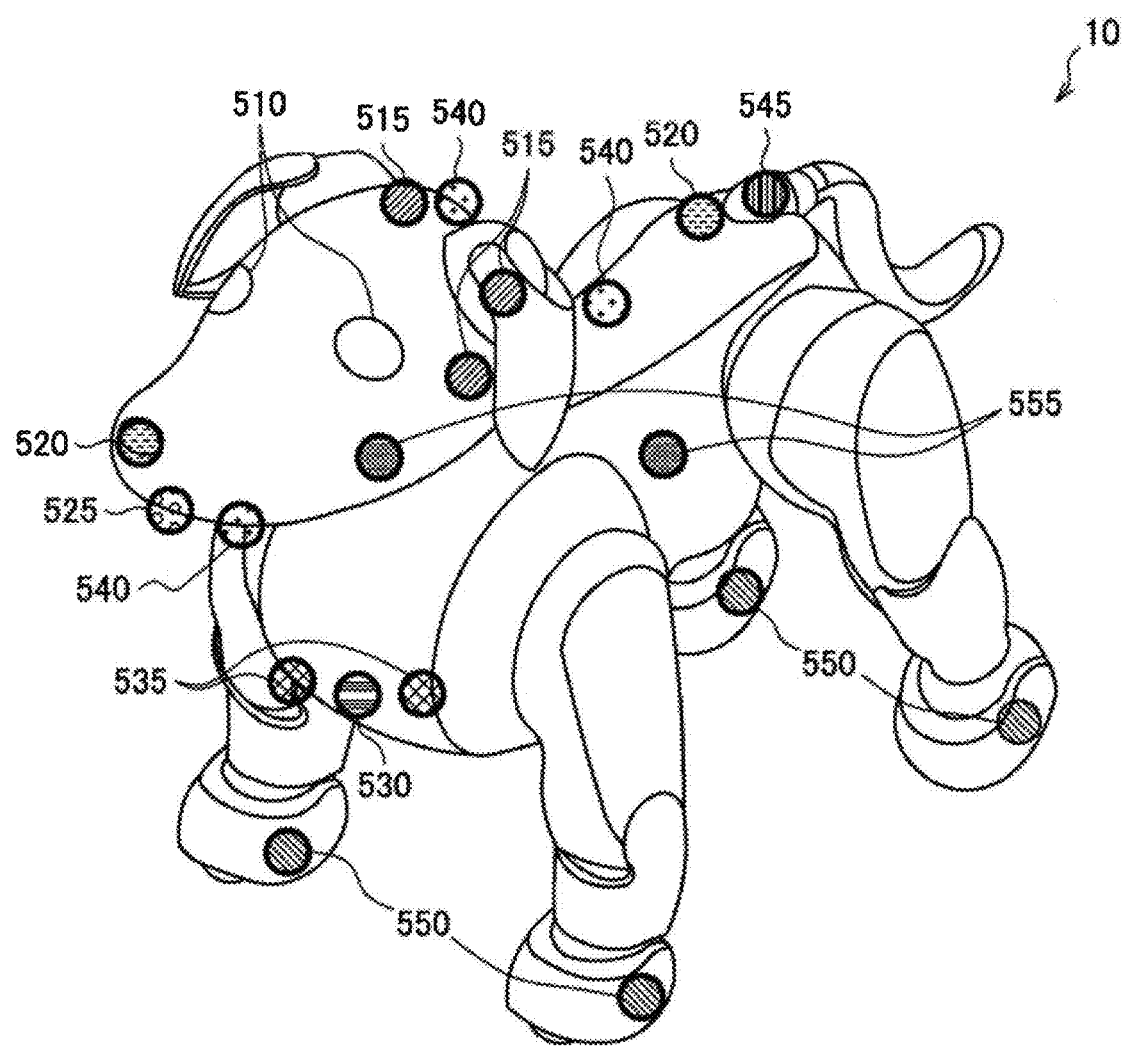
FIG. 1 illustrates a hardware configuration example of an autonomous mobile body according to an embodiment of the present disclosure.

Hereinafter, description is given in detail of preferred embodiments of the present disclosure with reference to the accompanying drawings. It is to be noted that, in the present specification and drawings, repeated description is omitted for components substantially having the same functional configuration by assigning the same reference numerals.

It is to be noted that description is given in the following order.

1. Configuration
  1.1. Overview of Autonomous Mobile Body 10
  1.2. Hardware Configuration Example of Autonomous Mobile Body 10
  1.3. Functional Configuration Example of Autonomous Mobile Body 10
2. Embodiment
  2.1. Overview
  2.2. Details of Motion Control
  2.3. Creation and Updating of Noise Map
  2.4. Motion Control on Basis of Noise Source Avoidance Priorities
  2.5. Flow of Motion
3. Conclusion 1. Configuration <<1.1. Overview of Autonomous Mobile Body 10>>

As described above, in recent years, various apparatuses have been developed that recognize an utterance of a user, and the like and execute a motion on the basis of a recognition result. Examples of the apparatuses as described above include an autonomous mobile body that changes a behavior in accordance with an utterance of a user, a surrounding environment, and the like.

Here, to achieve voice recognition with high accuracy, it is generally important to enhance, in signals of sounds acquired through a microphone, a ratio of power of a target sound (for example, a uttered voice of a user) that is a target voice for voice recognition to power of a non-target sound that is not the target voice, i.e., an SN ratio (Signal-to-Noise Ratio). Specifically, in an autonomous mobile body having a voice recognition function, it is desirable to enhance voice recognition accuracy by performing movement to a position where the SN ratio is to be improved.

However, in a technology described in PTL 1, the non-target sound is not taken into consideration, and a robot device is only moved toward a direction where a utterance or a face of a user has been recognized. For this reason, in the technology described in PTL 1, circumstances are also presumed under which approaching the user and a noise source that emits a non-target sound simultaneously results in a decrease in the SN ratio and a decrease in voice recognition accuracy.

In addition, in the technology described in the PTL 1, a motion of the robot device is controlled by recognition of the utterance or the face of the user as a trigger to approach the user. Accordingly, it is presumed that there is a high possibility that the robot device described in PTL 1 follows the user who exists around the robot device at all times, which may make the user feel annoying.

An information processor, an information processing method, and a program according to an embodiment of the present disclosure has been conceived by focusing on the above-described respects, and make it possible to cause an autonomous mobile body to execute a motion for further improving accuracy of sound recognition.

Here, first, description is given of an overview of an autonomous mobile body 10 according to an embodiment of the present disclosure. The autonomous mobile body 10 according to an embodiment of the present disclosure is an information processor that estimates circumstances on the basis of collected sensor information and autonomously selects and executes various motions according to circumstances. One of features of the autonomous mobile body 10 is to autonomously execute motions that are presumed to be optimal for each circumstance, unlike a robot that simply performs motions in conformity with commands instructed by a user.

For example, in a case where a target sound that is a target voice for voice recognition processing, i.e., an utterance of a user is not detected, the autonomous mobile body 10 according to an embodiment of the present disclosure may perform an autonomous motion to avoid input of a non-target sound that is not the above-described target voice. In a case where an utterance of a user is detected, this motion makes it possible to effectively increase a possibility of improving accuracy of voice recognition with respect to the utterance without following the user at all times.

In addition, in a case where the target sound is detected, the autonomous mobile body 10 according to an embodiment of the present disclosure may move to a position where an input level of the non-target sound becomes lower, around an approach target that is determined on the basis of the target sound. That is, the autonomous mobile body 10 according to an embodiment of the present disclosure performs an moving motion in consideration of the non-target sound, which makes it possible to improve the SN ratio and effectively improve accuracy of voice recognition with respect to the utterance of the user.

In this manner, the autonomous mobile body 10 according to an embodiment of the present disclosure comprehensively judges its own state, the surrounding environment, and the like similarly to animals including humans, to thereby determine and execute autonomous motions. In the above respects, the autonomous mobile body 10 according to an embodiment of the present disclosure obviously differs from a passive apparatus that executes, on the basis of instructions, corresponding motions or processing.

The autonomous mobile body 10 according to an embodiment of the present disclosure may be an autonomous moving type robot that performs an autonomous posture control in a space and executes various motions. The autonomous mobile body 10 may be, for example, an autonomous moving type robot having a shape simulating a human or an animal such as a dog and having a motion capability. In addition, the autonomous mobile body 10 may be, for example, an apparatus such as a vehicle or unmanned aerial vehicle having a communication capability with a user. Shapes, capabilities, or levels of desire and the like of the autonomous mobile body 10 according to an embodiment of the present disclosure may be appropriately designed in accordance with purposes and roles.

<<1.2. Hardware Configuration Example of Autonomous Mobile Body 10>>

Next, description is given of a hardware configuration example of the autonomous mobile body 10 according to an embodiment of the present disclosure. It is to be noted that, in the following, description is given, by way of example, of a case where the autonomous mobile body 10 is a dog-type four-legged walking robot.

FIG. 1 illustrates a hardware configuration example of the autonomous mobile body 10 according to an embodiment of the present disclosure. As illustrated in FIG. 1, the autonomous mobile body 10 is a dog-type four-legged walking robot having a head, a torso, four leg parts, and a tail. In addition, the autonomous mobile body 10 is provided with two displays 510 on the head.

In addition, the autonomous mobile body 10 includes various sensors. The autonomous mobile body 10 includes, for example, a microphone 515, a camera 520, a ToF (Time of Flight) sensor 525, a human detection sensor 530, a distance measuring sensor 535, a touch sensor 540, an illuminance sensor 545, a sole button 550, and an inertia sensor 555.

(Microphone 515)

The microphone 515 has a function of collecting a surrounding sound. Examples of the above-described sound include an utterance of a user and a surrounding environmental sound. The autonomous mobile body 10 may include, for example, four microphones on the head. Providing a plurality of microphones 515 makes it possible to collect sounds generated in the surroundings with high sensitivity and to achieve sound localization.

(Camera 520)

The camera 520 has a function of capturing an image of the user or the surrounding environment. The autonomous mobile body 10 may include, for example, two wide-angle cameras at the tip of a nose and at a waist. In this case, the wide-angle camera disposed at the tip of the nose captures an image corresponding to a front field of view of the autonomous mobile body 10 (i.e., a field of view of a dog), and the wide-angle camera at the waist captures an image of a surrounding region centered on an upper side. The autonomous mobile body 10 is able to extract feature points of a ceiling, and the like, for example, on the basis of images captured by the wide-angle camera disposed at the waist to achieve SLAM (Simultaneous Localization and Mapping).

(ToF Sensor 525)

The ToF sensor 525 has a function of detecting a distance with respect to an object that exists in front of the head. The ToF sensor 525 is provided at the tip of the head. According to the ToF sensor 525, it is possible to detect distances with respect to various objects with high accuracy, thus making it possible to achieve motions corresponding to relative positions with respect to target objects including the user, obstacles, and the like.

(Human Detection Sensor 530)

The human detection sensor 530 has a function of detecting a location of the user or a pet raised by the user. The human detection sensor 530 is disposed, for example, at the chest. According to the human detection sensor 530, detecting an animal body that exists in the front makes it possible to achieve various motions for the animal body, e.g., motions corresponding to emotions such as an interest, a fear, and a surprise.

(Distance Measuring Sensor 535)

The distance measuring sensor 535 has a function of acquiring circumstances of a floor surface of the front of the autonomous mobile body 10. The distance measuring sensor 535 is disposed, for example, at the chest. According to the distance measuring sensor 535, it is possible to detect a distance with respect to an object that exists on the floor surface of the front of the autonomous mobile body 10 with high accuracy, thus making it possible to achieve a motion corresponding to a relative position with respect to the object.

(Touch Sensor 540)

The touch sensor 540 has a function of detecting a contact by the user. The touch sensor 540 is disposed, for example, at a location where the user is highly likely to touch the autonomous mobile body 10, such as the top of the head, the lower jaw, or the back. The touch sensor 540 may include, for example, a capacitive or pressure sensitive touch sensor. According to the touch sensor 540, it is possible to detect a contact action such as touching, stroking, tapping, or pushing by the user, thus making it possible to perform a motion corresponding to the contact action.

(Illuminance Sensor 545)

The illuminance sensor 545 detects illuminance in a space in which the autonomous mobile body 10 is positioned. The illuminance sensor 545 may be disposed, for example, at the root of the tail on the back surface of the head. According to the illuminance sensor 545, it is possible to detect surrounding brightness and execute a motion corresponding to the brightness.

(Sole Button 550)

The sole button 550 has a function of detecting whether or not a bottom surface of a leg part of the autonomous mobile body 10 is in contact with the floor. To this end, the sole button 550 is disposed at each of locations corresponding to pads of the four leg parts. According to the sole button 550, it is possible to detect contact or non-contact between the autonomous mobile body 10 and the floor surface, thus making it possible for the autonomous mobile body 10 to grasp, for example, having been lifted by the user, and the like.

(Inertia Sensor 555)

The inertia sensor 555 is a six-axis sensor that detects physical amounts such as velocities, accelerations, and rotations of the head and the torso. That is, the inertia sensor 555 detects accelerations and angular velocities of an X-axis, a Y-axis, and a Z-axis. The inertia sensor 555 is disposed at each of the head and the torso. According to the inertia sensor 555, it is possible to detect movements of the head and torso of the autonomous mobile body 10 with high accuracy, thus making it possible to achieve motion control depending on circumstances.

The description has been given above of examples of the sensors included in the autonomous mobile body 10 according to an embodiment of the present disclosure. It is to be noted that the configuration described above with reference to FIG. 1 is merely an example, and the configurations of the sensors that may be included in the autonomous mobile body 10 are not limited to such examples. The autonomous mobile body 10 may further include, aside from the above-described configuration, for example, a temperature sensor, a geomagnetic sensor, and various communication devices including a GNSS (Global Navigation Satellite System) signal receiver. The configurations of the sensors included in the autonomous mobile body 10 may be flexibly modified in accordance with specifications and operations.

Figure 2:
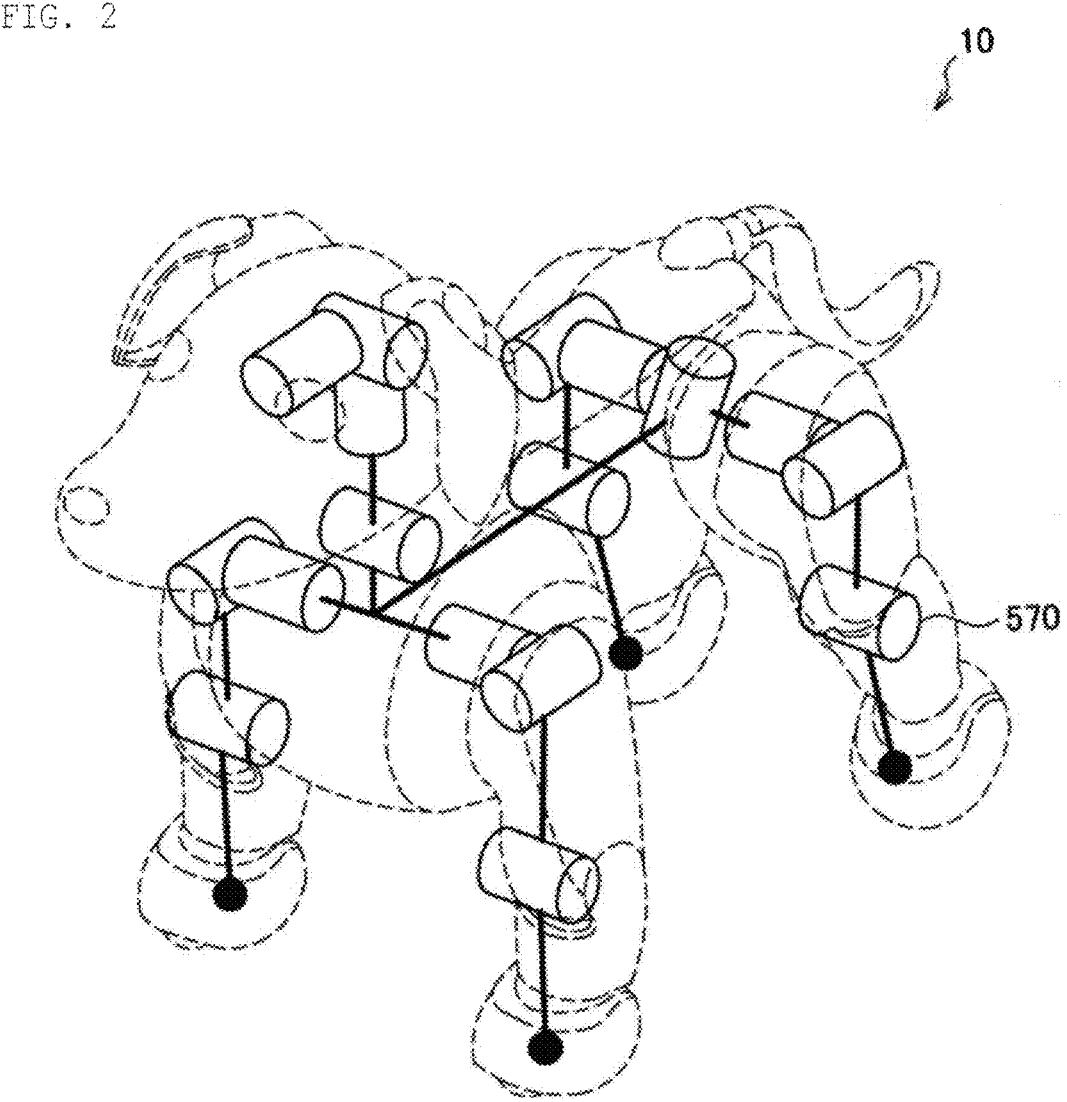
FIG. 2 is a configuration example of actuators included in the autonomous mobile body according to the same embodiment.

Subsequently, description is given of a configuration example of joints of the autonomous mobile body 10 according to an embodiment of the present disclosure. FIG. 2 is a configuration example of actuators 570 included in the autonomous mobile body 10 according to an embodiment of the present disclosure. The autonomous mobile body 10 according to an embodiment of the present disclosure has a total of 22 rotational degrees of freedom, in addition to rotary points illustrated in FIG. 2, with two for each of the ears and the tail, and one for the mouth.

For example, the autonomous mobile body 10 has three degrees of freedom in the head, thereby making it possible to achieve both nodding and neck-tilting motions. In addition, the autonomous mobile body 10 reproduces a swinging motion of the waist using the actuator 570 provided at the waist, thereby making it possible to achieve natural and flexible motions closer to real dogs.

It is to be noted that the autonomous mobile body 10 according to an embodiment of the present disclosure may combine a single-axis actuator and a biaxial actuator, for example, to thereby achieve the above-described 22 rotational degrees of freedom. For example, the single-axis actuator may be employed at elbows and knees of the leg parts, and the biaxial actuator may be employed at shoulders and the bases of thighs.

Figure 3:
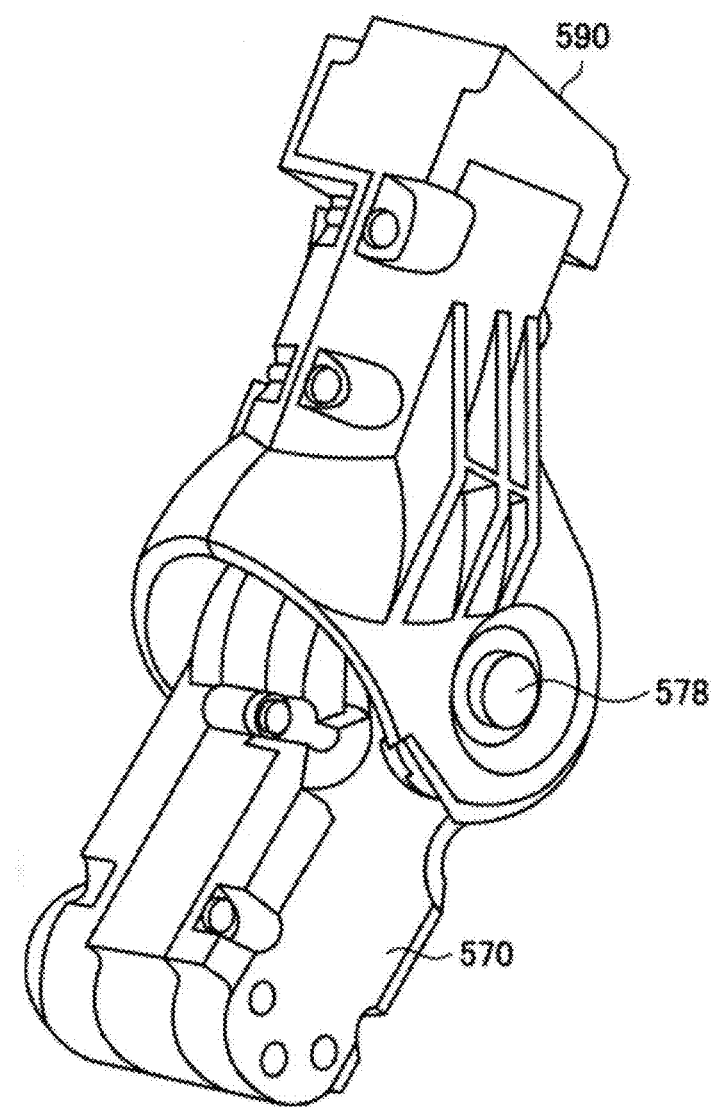
FIG. 3 is an explanatory diagram of an operation of the actuator included in the autonomous mobile body according to the same embodiment.
Figure 4:
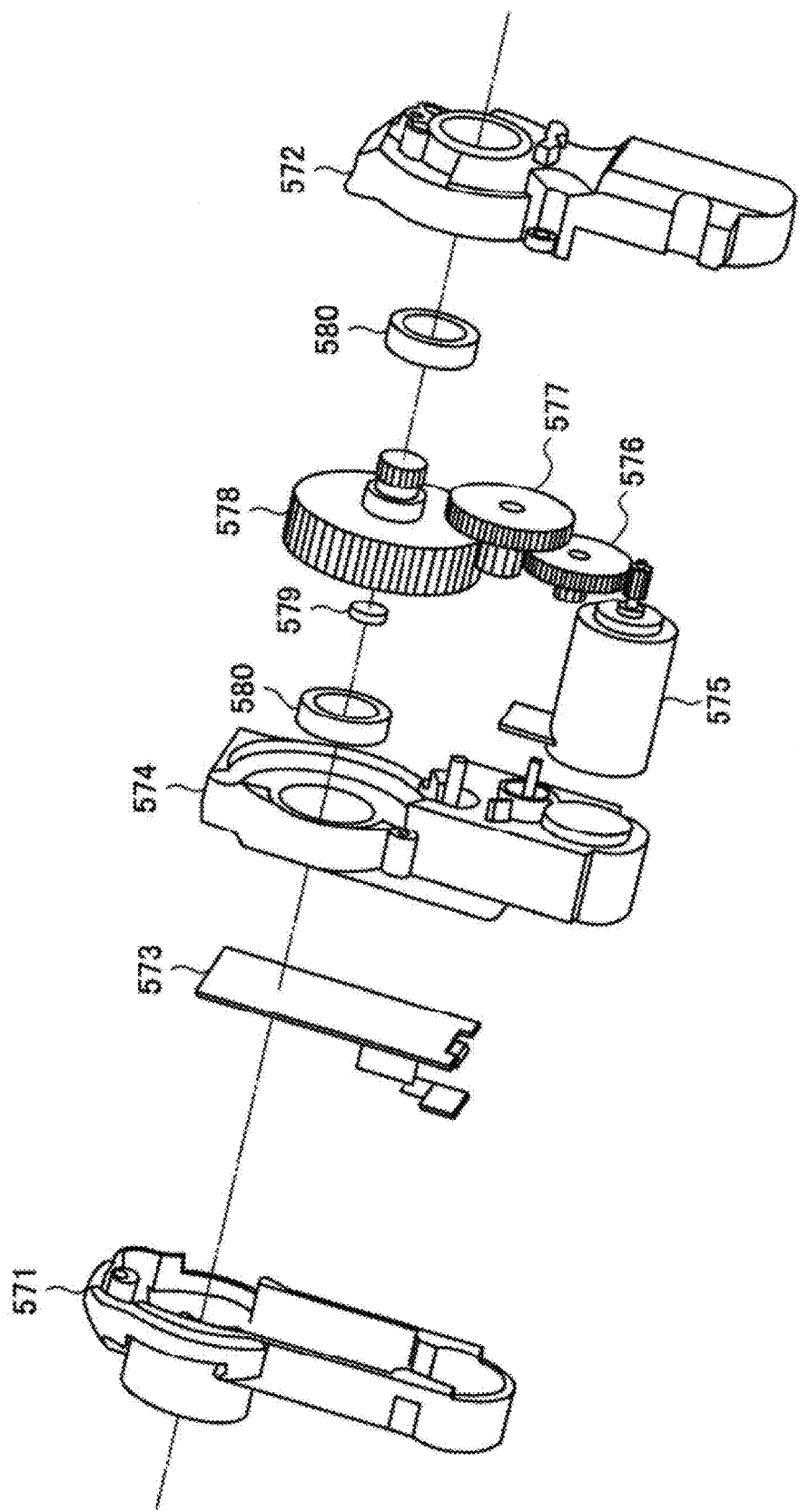
FIG. 4 is an explanatory diagram of the operation of the actuator included in the autonomous mobile body according to the same embodiment.

FIGS. 3 and 4 are each an explanatory diagram of motions of the actuator 570 included in the autonomous mobile body 10 according to an embodiment of the present disclosure. Referring to FIG. 3, the actuator 570 rotates an output gear using a motor 575 to thereby drive a movable arm 590 at any rotational position and rotational speed.

Referring to FIG. 4, the actuator 570 according to an embodiment of the present disclosure includes a rear cover 571, a gear box cover 572, a control substrate 573, a gear box base 574, the motor 575, a first gear 576, a second gear 577, an output gear 578, a detection magnet 579, and two bearings 580.

The actuator 570 according to an embodiment of the present disclosure may include, for example, a magnetic svGMR (spin-valve Giant Magnetoresistive). The control substrate 573 rotates the motor 575 on the basis of control made by a main processor to thereby transmit power to the output gear 578 via the first gear 576 and the second gear 577, thus making it possible to drive the movable arm 590.

In addition, a position sensor included in the control substrate 573 detects a rotation angle of the detection magnet 579 that rotates in synchronization with the output gear 578 to thereby detect the rotation angle, i.e., the rotational position of the movable arm 590 with high accuracy.

It is to be noted that the magnetic svGMR has advantages of superior durability because of its non-contact type and of being less influenced by signal variation due to distance variations of the detection magnet 579 and the position sensor when being used in a GMR-saturated region.

The description has been given above of the configuration example of the actuators 570 included in the autonomous mobile body 10 according to an embodiment of the present disclosure. According to the above-described configuration, it is possible to control bending and stretching motions of the joints included in the autonomous mobile body 10 with high accuracy, and to detect rotational positions of the joints accurately.

Figure 5:
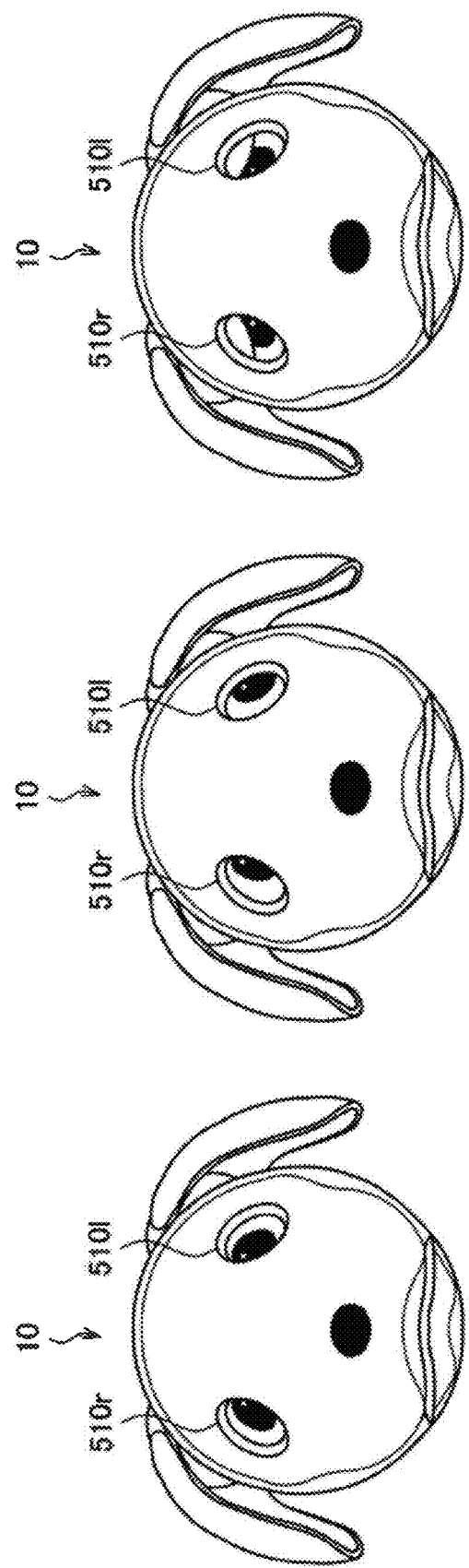
FIG. 5 is an explanatory diagram of functions of a display included in the autonomous mobile body according to the same embodiment.

Subsequently, description is given of functions of the display 510 included in the autonomous mobile body 10 according to an embodiment of the present disclosure, with reference to FIG. 5. FIG. 5 is an explanatory diagram of the functions of the display 510 included in the autonomous mobile body 10 according to an embodiment of the present disclosure.

(Display 510)

The display 510 has a function of visually expressing movements of eyes and emotions of the autonomous mobile body 10. As illustrated in FIG. 5, the display 510 is able to express motions of an eyeball, a pupil, and an eyelid in response to emotions and motions. The display 510 does not intentionally display a letter, a symbol, an image not related to movements of an eyeball, or the like, to thereby produce a natural motion close to an animal such as a real live dog.

In addition, as illustrated in FIG. 5, the autonomous mobile body 10 includes two displays 510r and 510l corresponding to the right eye and the left eye, respectively. The displays 510r and 510l are implemented, for example, by two independent OLEDs (Organic Light Emitting Diodes). According to the OLED, it is possible to reproduce a curved surface of the eyeball, thus making it possible to achieve a more natural exterior, as compared with a case where a pair of eyeballs is expressed by one flat display or a case where two eyeballs are expressed by respective two independent flat displays.

As described above, according to the displays 510r and 510l, it is possible to express lines of sight and emotions of the autonomous mobile body 10 as illustrated in FIG. 5 with high accuracy and flexibility. In addition, it is possible for the user to intuitively grasp the state of the autonomous mobile body 10 from the motion of the eyeballs displayed on the displays 510.

Figure 6:
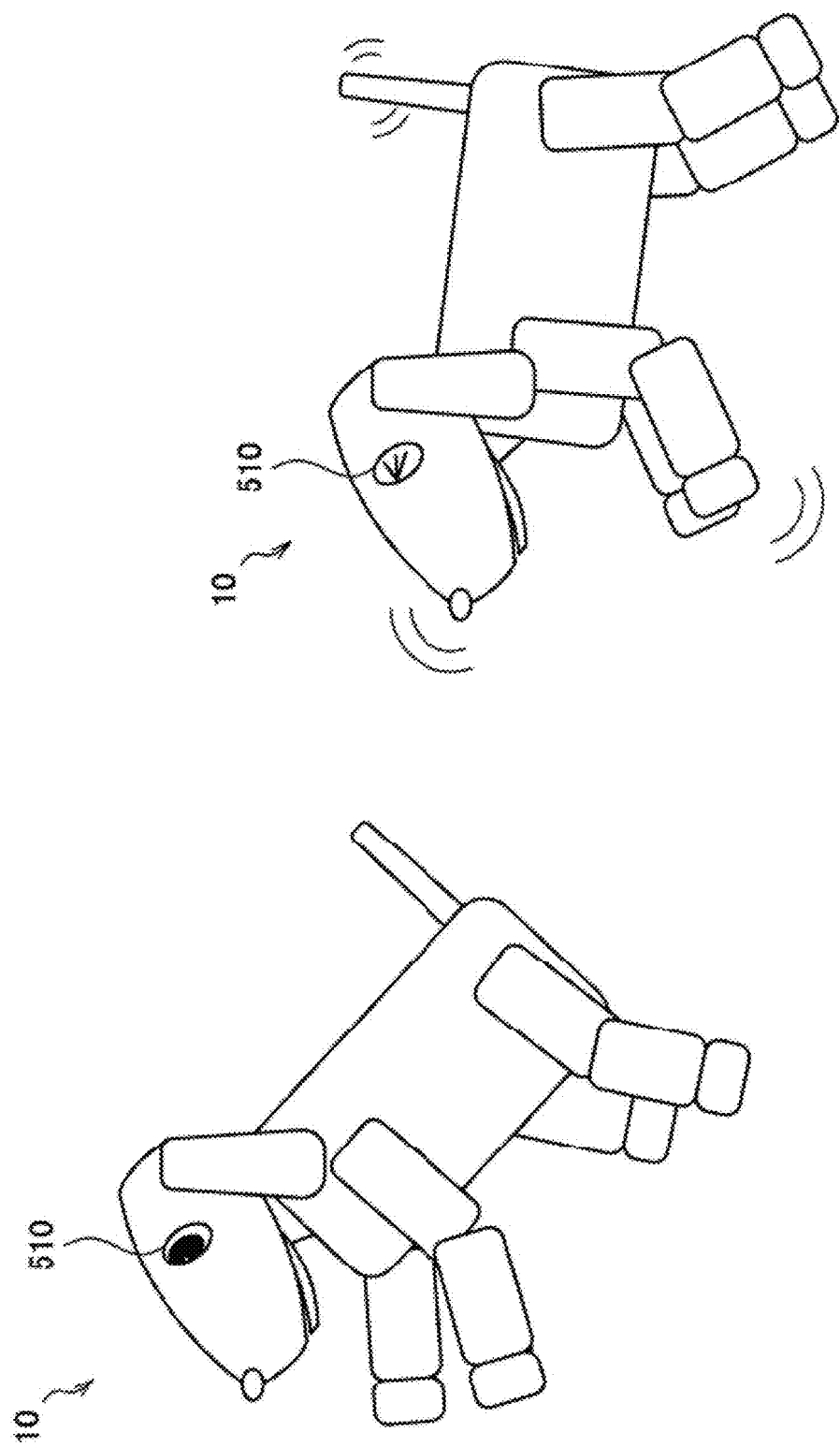
FIG. 6 illustrates motion examples of the autonomous mobile body according to the same embodiment.

The description has been given above of the hardware configuration example of the autonomous mobile body 10 according to an embodiment of the present disclosure. According to the above-described configuration, controlling the motions of the joints and the eyeballs of the autonomous mobile body 10 with high accuracy and flexibility makes it possible to achieve a motion and an emotional expression closer to a real living creature, as illustrated in FIG. 6. It is to be noted that FIG. 6 illustrates motion examples of the autonomous mobile body 10 according to an embodiment of the present disclosure; however, FIG. 6 illustrates an external structure of the autonomous mobile body 10 in a simplified manner to give description, focusing on the motions of the joints and the eyeballs of the autonomous mobile body 10. Similarly, in the following description, the external structure of the autonomous mobile body 10 may be illustrated in a simplified manner in some cases; however, the hardware configuration and the exterior of the autonomous mobile body 10 according to an embodiment of the present disclosure are not limited to the examples illustrated in the drawings, and may be appropriately designed.

<<1.3. Functional Configuration Example of Autonomous Mobile Body 10>>

Figure 7:
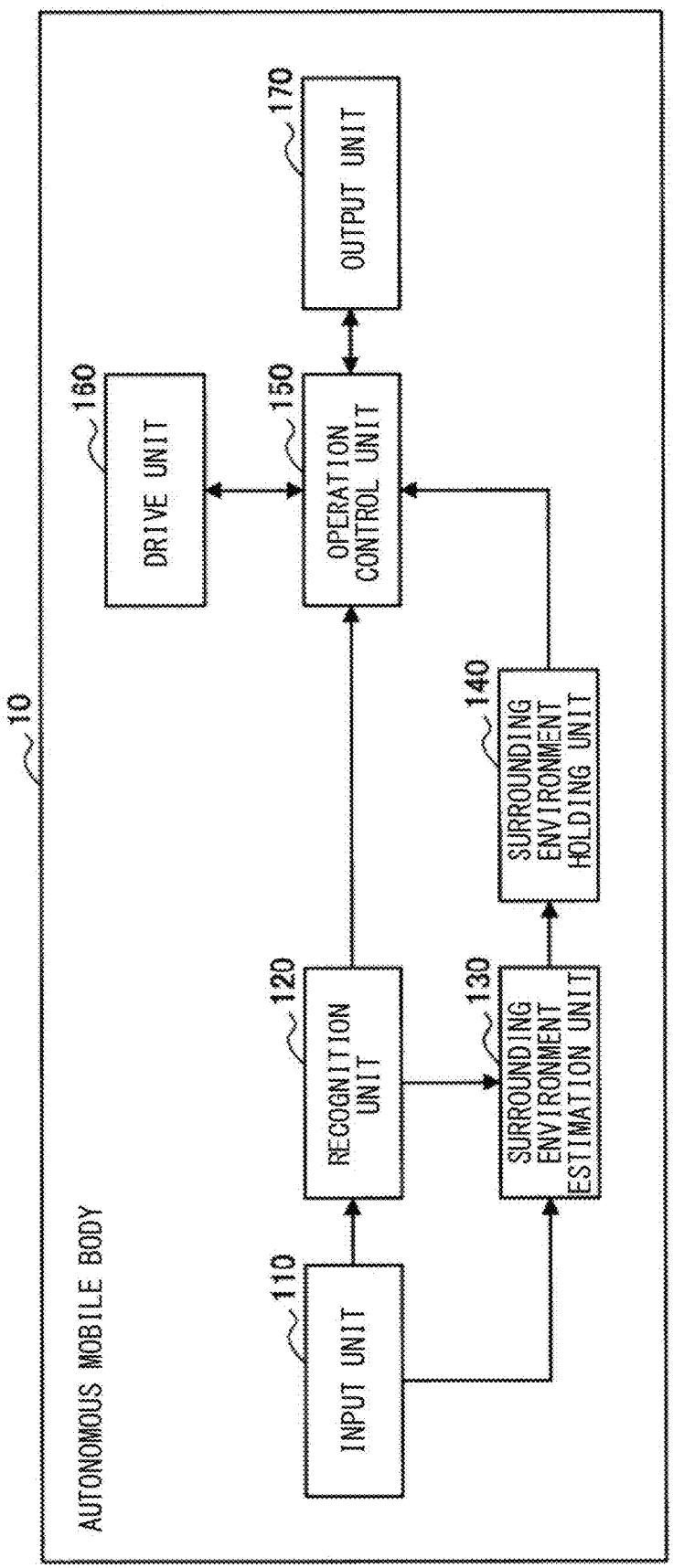
FIG. 7 illustrates a functional configuration example of the autonomous mobile body according to the same embodiment.

Next, description is given of a functional configuration example of the autonomous mobile body 10 according to an embodiment of the present disclosure. FIG. 7 illustrates a functional configuration example of the autonomous mobile body 10 according to an embodiment of the present disclosure. Referring to FIG. 7, the autonomous mobile body 10 according to an embodiment of the present disclosure includes an input unit 110, a recognition unit 120, a surrounding environment estimation unit 130, a surrounding environment holding unit 140, an operation control unit 150, a drive unit 160, and an output unit 170.

(Input Unit 110)

The input unit 110 has a function of collecting various types of information regarding a user and a surrounding environment. The input unit 110 collects, for example, an utterance of the user, environmental sounds generated in the surroundings, image information regarding the user and the surrounding environment, and various types of sensor information. To this end, the input unit 110 includes various sensors illustrated in FIG. 1.

(Recognition Unit 120)

The recognition unit 120 has a function of performing various recognitions of the user, objects in the surroundings, and the state of the autonomous mobile body 10 on the basis of various types of information collected by the input unit 110. For instances, the recognition unit 120 may perform human recognition, face recognition, recognition of facial expressions and lines of sight, voice recognition, object recognition, color recognition, shape recognition, marker recognition, obstacle recognition, step recognition, brightness recognition, and the like.

(Surrounding Environment Estimation Unit 130)

The surrounding environment estimation unit 130 has a function of creating and updating a noise map indicating circumstances under which a non-target sound is generated, on the basis of sensor information collected by the input unit 110 and a recognition result by the recognition unit 120. The details of the function of the surrounding environment estimation unit 130 are described later separately.

(Surrounding Environment Holding Unit 140)

The surrounding environment holding unit 140 has a function of holding the noise map created and updated by the surrounding environment estimation unit 130.

(Operation Control Unit 150)

The operation control unit 150 has a function of making an action plan on the basis of the recognition result by the recognition unit 120 and the noise map held by the surrounding environment holding unit 140 and controlling operations of the drive unit 160 and the output unit 170 on the basis of the action plan. For example, the operation control unit 150 performs rotational control of the actuators 570, display control of the display 510, voice output control by a speaker, and the like on the basis of the above-described action plan. The details of the function of the operation control unit 150 according to an embodiment of the present disclosure are described separately.

(Drive Unit 160)

The drive unit 160 has a function of bending and stretching a plurality of joints included in the autonomous mobile body 10 on the basis of control by the operation control unit 150. More specifically, the drive unit 160 drives the actuators 570 included in the respective joints on the basis of the control by the operation control unit 150.

(Output Unit 170)

The output unit 170 has a function of outputting visual information and sound information on the basis of control by the operation control unit 150. To this end, the output unit 170 includes the display 510 and a speaker.

The description has been given above of the functional configuration of the autonomous mobile body 10 according to an embodiment of the present disclosure. It is to be noted that the configuration illustrated in FIG. 7 is merely an example, and the functional configuration of the autonomous mobile body 10 is not limited to such an example. The autonomous mobile body 10 according to an embodiment of the present disclosure may include, for example, a communication unit that performs communication with an information processing server and another autonomous mobile body. In addition, the functions of the recognition unit 120, the surrounding environment estimation unit 130, the operation control unit 150, and the like may be implemented as functions of the above-descried information processing server. In this case, the information processing server is able to execute various types of recognition processing, creation or updating of the noise map, and the action plan on the basis of the sensor information collected by the input unit 110 of the autonomous mobile body 10, and control the drive unit 160 and the output unit 170 of the autonomous mobile body 10. The functional configuration of the autonomous mobile body 10 according to an embodiment of the present disclosure may be flexibly modified in accordance with specifications and operations.

2. Embodiment

<<2.1. Overview>>

Next, description is given of an embodiment of the present disclosure. As described above, to improve accuracy of voice recognition with respect to the target sound, the autonomous mobile body 10 according to an embodiment of the present disclosure performs an autonomous motion to improve an SN ratio of the target sound and the non-target sound.

Here, presumed techniques for improving the SN ratio include a technique of performing signal processing (multimicrophone signal processing and single microphone signal processing) on an input signal, and a technique using a directional microphone or the like. However, it can be said that the SN ratio is most strongly influenced by a physical distance with respect to a target sound source or a non-target sound source (hereinafter also referred to as "noise source").

To this end, the autonomous mobile body 10 according to the present embodiment does not simply approach the target sound source, but stays as far away from the non-target sound source as possible while approaching the target sound source, thus making it possible to effectively improve the SN ratio.

Figure 8A:
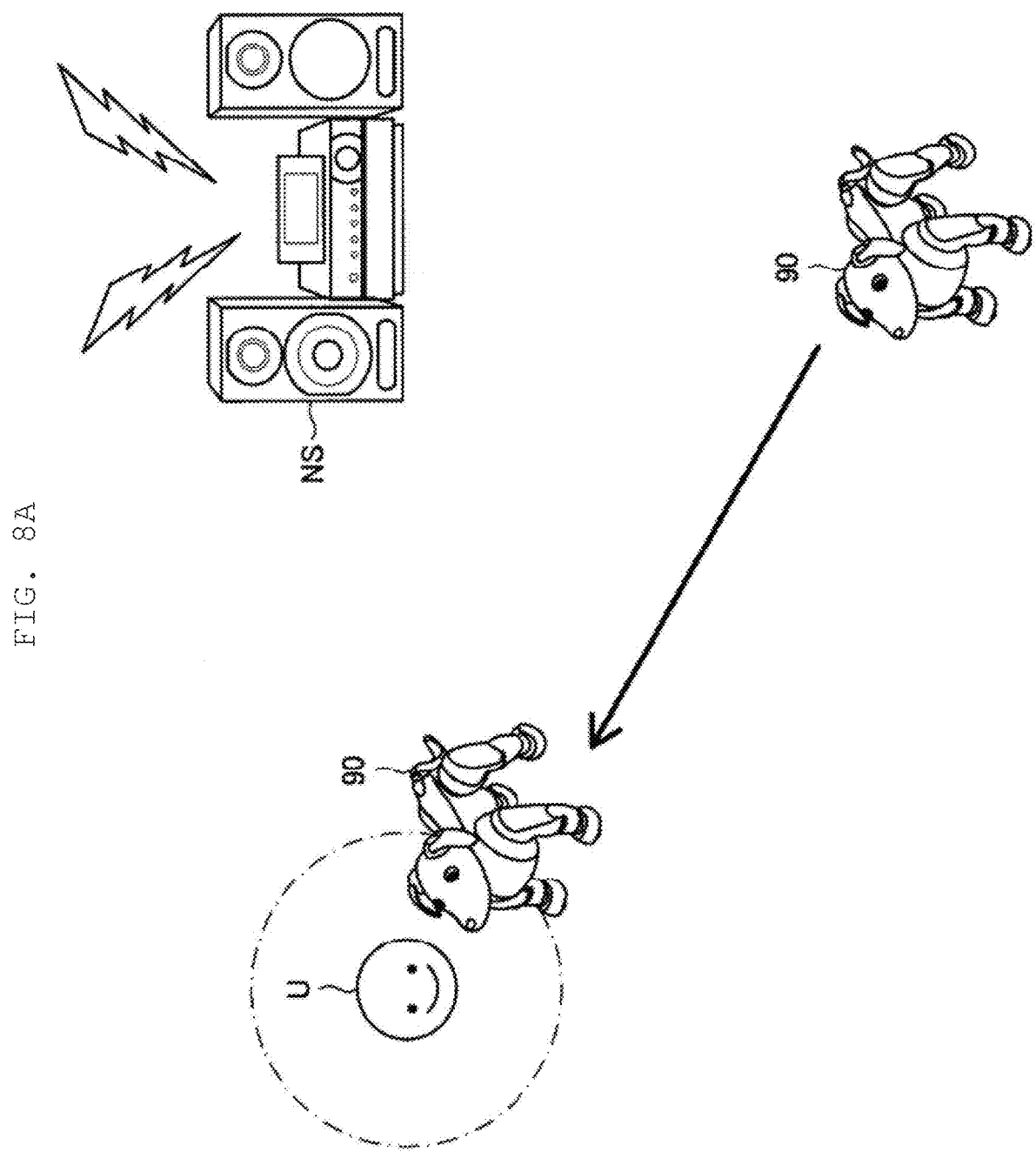
FIG. 8A is an explanatory diagram of a motion overview of the autonomous mobile body according to the same embodiment.
Figure 8B:
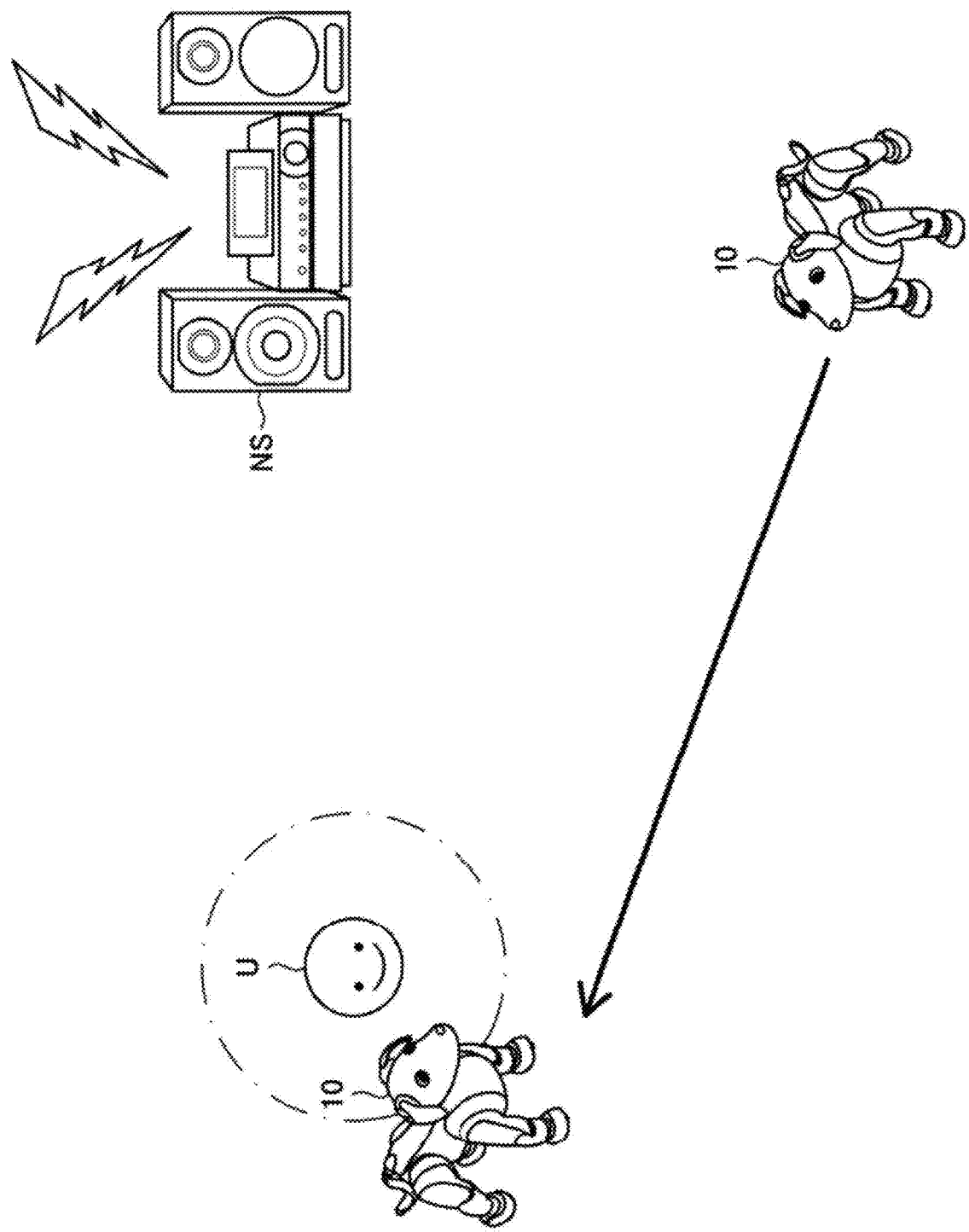
FIG. 8B is an explanatory diagram of the motion overview of the autonomous mobile body according to the same embodiment.

FIG. 8A and FIG. 8B are explanatory diagrams of a motion overview of the autonomous mobile body 10 according to the present embodiment. FIG. 8A illustrates an example of movement control by a comparison technique according to the present embodiment. In the example illustrated in FIG. 8A, in a case where a voice of a user U, i.e., a target sound is detected, a comparator 90 approaches the user U through the shortest route to increase an input level (a sound pressure level) of the target sound. However, at this time, the comparator 90 does not consider existence of a noise source NS that emits the non-target sound; therefore, the comparator 90 approaches the noise source NS simultaneously with approaching the user U. Thus, in the comparison technique, an input level of the non-target sound is also increased together with the input level of the target sound, and as a result, a possibility arises that an effect of improving the SN ratio is reduced and accuracy of voice recognition with respect to an utterance of the user U is decreased.

In contrast, FIG. 8B illustrates an example of movement control by an information processing method according to the present embodiment. As illustrated in FIG. 8B, in a case where the voice of the user U, i.e., the target sound is detected, the autonomous mobile body 10 according to the present embodiment performs movement in consideration of existence of the noise source that emits the non-target sound. Specifically, in a case where the target sound is detected, the operation control unit 150 according to the present embodiment may move the autonomous mobile body 10 to a position where the input level of the non-target sound becomes lower, around the approach target that is determined on the basis of the target sound.

Here, the above-described approach target may be the user U who emits the target sound, i.e., an uttered voice. That is, in a case where an utterance of the user U is detected, the operation control unit 150 according to the present embodiment is able to move the autonomous mobile body 10 to a position where an input level of an utterance of a user becomes higher and the input level of the non-target sound emitted by the noise source NS becomes lower, around the user U that is the approach target.

In the example illustrated in FIG. 8B, the operation control unit 150 according to the present embodiment moves the autonomous mobile body 10 to a side opposite to a position where the non-target sound is emitted, i.e., the noise source NS with respect to the user U as a center. In this manner, according to the operation control unit 150 according to the present embodiment, it is possible to move the autonomous mobile body 10 farther away from the noise source NS and closer to the user U that is the approach target. In addition, in a case where the autonomous mobile body 10 is moved to the side opposite to the noise source NS with the user U interposed therebetween, the user U acts as a wall, and an effect of more effectively decreasing the input level of the non-target sound emitted by the noise source NS is expected.

According to the above-described function of the operation control unit 150 according to the present embodiment, it is possible to decrease the input level of the non-target sound or reduce a rate of increase of the input level together with increasing the input level of the target sound, which consequently makes it possible to effectively improve the SN ratio. Thus, according to the operation control unit 150 according to the present embodiment, it is possible to greatly improve the SN ratio with use of only a moving function intrinsic in the autonomous mobile body 10 without performing signal processing on an input signal and beamforming with use of a directional microphone.

<<2.2. Details of Motion Control>>

Next, description is given in more detail of motion control of the autonomous mobile body 10 by the operation control unit 150 according to the present embodiment. As described above, the operation control unit 150 according to the present embodiment causes the autonomous mobile body 10 to execute a motion in consideration of existence of the non-target sound in addition to the target sound, which makes it possible to improve the SN ratio and effectively improve accuracy of voice recognition with respect to the target sound.

Here, it is possible to define the target sound according to the present embodiment as a target voice for voice recognition by the recognition unit 120. The above-described target voice may include all voices. For example, it can be said that in a case where the autonomous mobile body 10 covers all voices outputted from a television, a radio, and the like and uttered voices of a user or a third person as targets for voice recognition, all the voices as described above are target sounds. In this case, the recognition unit 120 is able to detect all the voices as described above as the target sounds by comparison of pitches, or the like in consideration of a harmonic sound structure of human voices, or the like, for example. It is to be noted that in a case where all the voices as described above are target sounds, the autonomous mobile body 10 is able to perform some action or the like in response to a voice outputted from a television.

On one hand, the target sound according to the present embodiment may cover only a voice of a predetermined user registered in advance among the voices as described above. In this case, the recognition unit 120 performs speaker recognition on the basis of voice features of the user registered in advance or face recognition of a person existing in a direction from which an input signal comes, thus making it possible to detect only a uttered voice of the predetermined user as the target sound.

On the other hand, the target sound according to the present embodiment may cover only specific keywords, and specific words related to motion instructions among uttered voices by the predetermined user. In this case, the recognition unit 120 performs voice recognition on the basis of an input signal, thus making it possible to detect only the uttered voices of the predetermined user including the specific keywords and words as target sounds.

In addition, it is possible to define the non-target sound according to the present embodiment as all sounds other than the target sound. Examples of the non-target sound according to the present embodiment include working sounds in a kitchen and various non-voices generated by apparatuses such as an exhaust fan, a refrigerator, and a car.

Figure 9:
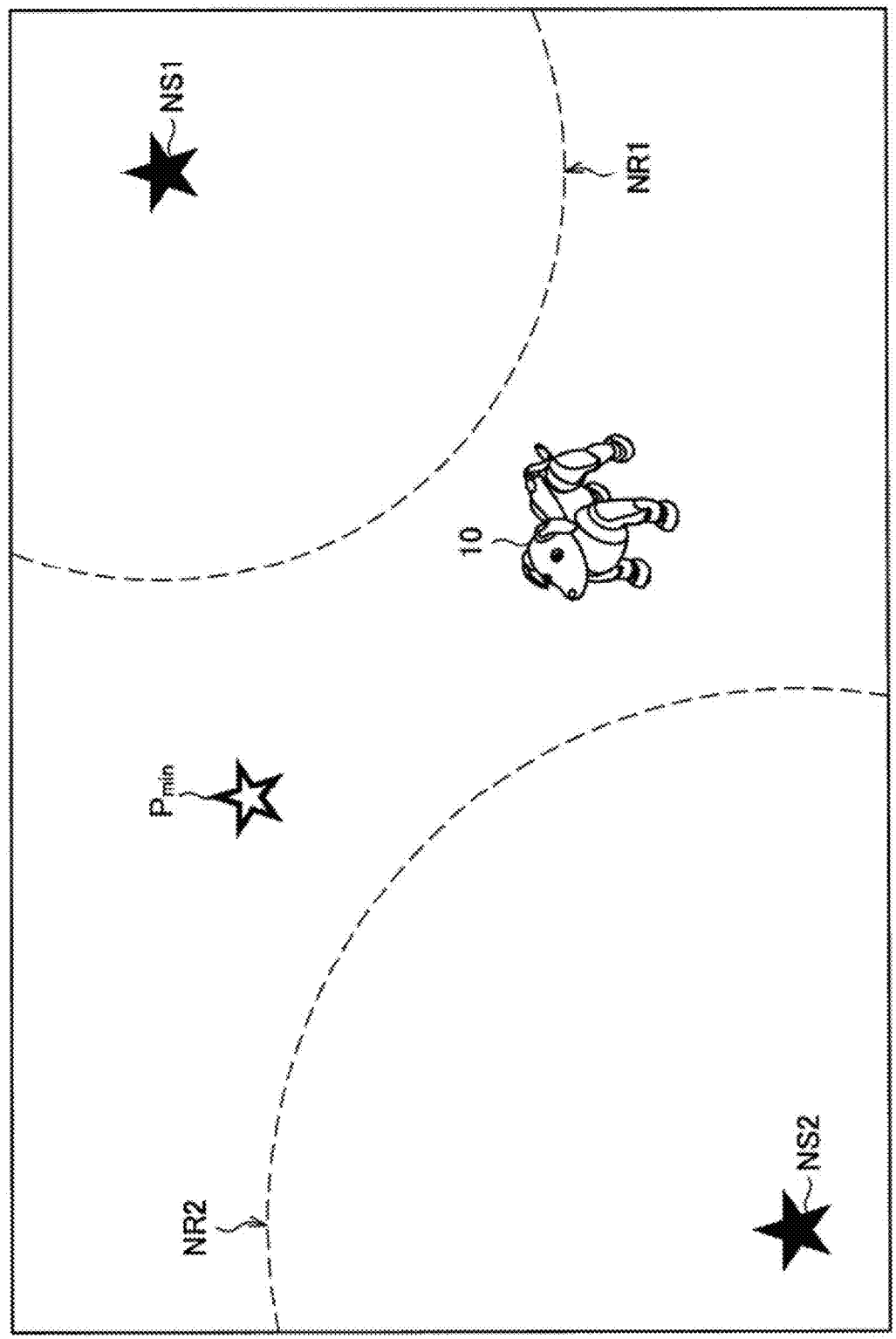
FIG. 9 is an explanatory diagram of motion control of the autonomous mobile body when a target sound according to the same embodiment is undetected.

The description has been given above of the details of the target sound and the non-target sound according to the present embodiment. Subsequently, referring to FIG. 9, description is given of motion control in a case where the target sound is not detected. FIG. 9 is an explanatory diagram of motion control of the autonomous mobile body 10 when the target sound according to the present embodiment is undetected. FIG. 9 illustrates an example of a noise map held by the surrounding environment holding unit 140.

Here, the noise map according to the present embodiment includes a map that is created and updated by the surrounding environment estimation unit 130 and indicates circumstances under which the non-target sound is generated. The noise map according to the present embodiment includes, for example, a noise source existing in a space where the autonomous mobile body 10 exists, and information regarding a noise region that is a region where the input level of the non-target sound emitted by the noise source is strong (for example, equal to or greater than a threshold value). In the example illustrated in FIG. 9, the noise map includes noise sources NS1 and NS2 and information of noise regions NR1 and NR2 respectively corresponding to the noise sources NS1 and NS2.

One of features of the operation control unit 150 according to the present embodiment is to control a motion of the autonomous mobile body 10 on the basis of the noise map including information as described above. For example, in a case where the target sound is not detected, the operation control unit 150 according to the present embodiment may control the motion of the autonomous mobile body 10 to avoid input of the non-target sound on the basis of the noise map.

More specifically, in a case where the target sound is not detected, the operation control unit 150 according to the present embodiment is able to limit a movement range of the autonomous mobile body 10 within a region where the input level of the non-target sound is equal to or lower than the threshold value, on the basis of the noise map. For example, in the example illustrated in FIG. 9, in a case where the target sound is not detected, the operation control unit 150 may limit the movement range of the autonomous mobile body 10 within a region other than both the noise regions NR1 and NR2 to prevent the autonomous mobile body 10 from entering the noise regions NR1 and NR2. At this time, the operation control unit 150 may randomly move the autonomous mobile body 10 within the above-described region, or may move the autonomous mobile body 10 to a position $P_{min}$ where a sound pressure of the non-target sound is expected to be minimum, or the like.

According to the above-described control by the operation control unit 150 according to the present embodiment, even in a case where the target sound is not detected, operating the autonomous mobile body 10 to suppress input of the non-target sound as much as possible makes it possible to effectively improve accuracy of voice recognition with respect to the target sound in a case where a user issues a call or the like, i.e., in a case where the target sound is detected.

Subsequently, description is given of details of motion control on the basis of the noise map in a case where the target sound according to the present embodiment is detected. As described above, one of features of the operation control unit 150 according to the present embodiment is to move the autonomous mobile body 10 to a position where the input level of the target sound becomes higher and the input level of the non-target sound becomes lower, around the approach target in a case where the target sound is detected. At this time, the operation control unit 150 according to the present embodiment refers to the noise map, thus making it possible to achieve the above-described motion control with high accuracy.

Figure 10:
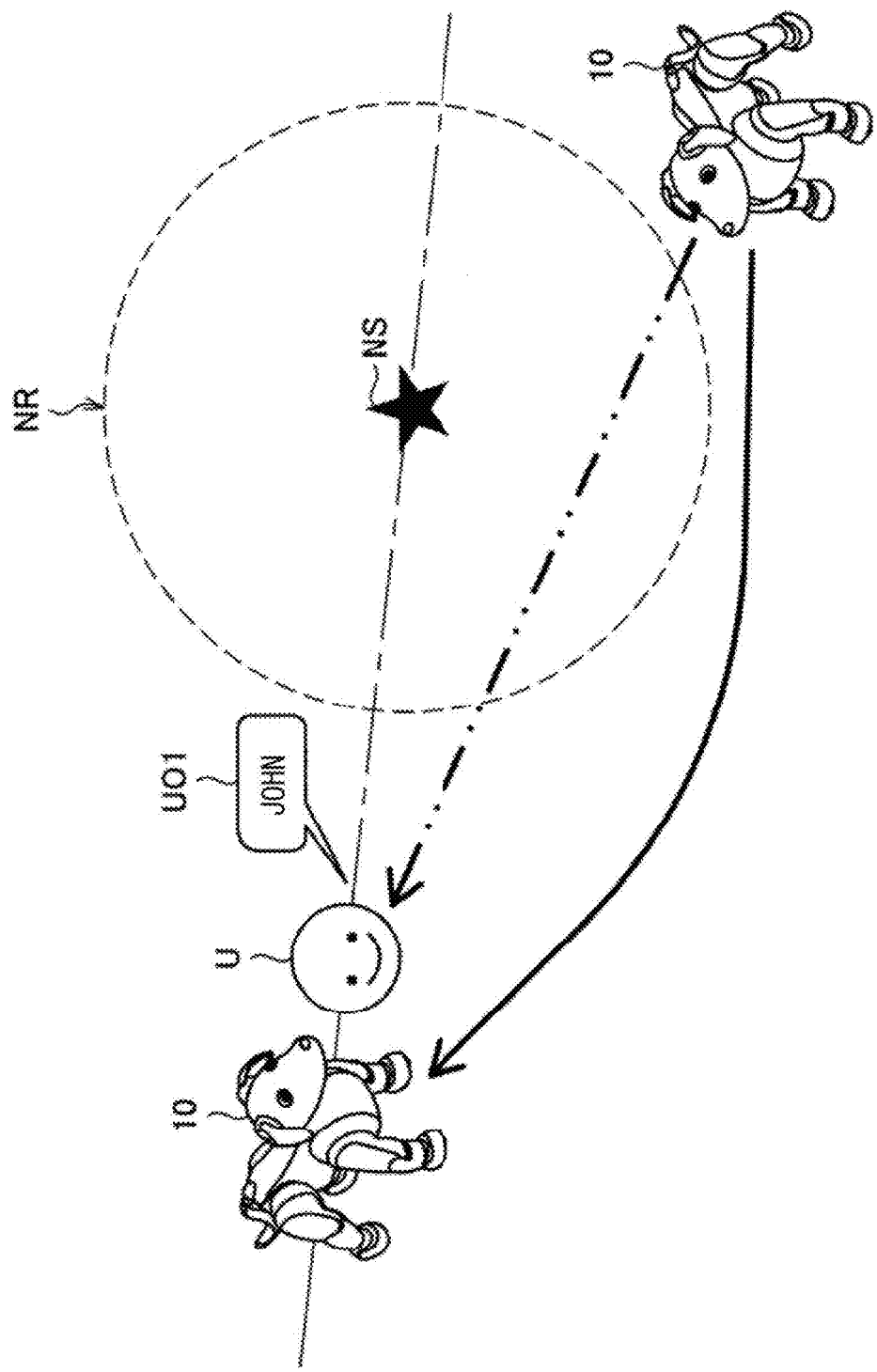
FIG. 10 is an explanatory diagram of motion control on the basis of a noise map in a case where the target sound according to the same embodiment is detected.

FIG. 10 is an explanatory diagram of motion control on the basis of the noise map in a case where the target sound according to the present embodiment is detected. In an example illustrated in FIG. 10, the operation control unit 150 causes the autonomous mobile body 10 to approach the user U on the basis of detection of an uttered voice UO1 of the user U who calls the name of the autonomous mobile body 10, i.e., the target sound. At this time, the operation control unit 150 according to the present embodiment refers to the noise map, and controls movement of the autonomous mobile body 10 in consideration of the noise source NS and a noise region NR included in the noise map.

For example, in circumstances illustrated in FIG. 10, as indicated by a chain double-dashed line in the drawing, in a case where the autonomous mobile body 10 approaches the user U through the shortest route, the autonomous mobile body 10 moves in the noise region NR. However, the operation control unit 150 according to the present embodiment refers to the noise map, thus making it possible to move the autonomous mobile body 10 to a position farther away from the noise source NS without causing the autonomous mobile body 10 to enter the noise region NR or stop in the noise region NR. More specifically, the operation control unit 150 may cause the autonomous mobile body 10 to go around the noise region NR as indicated by a solid line in the drawing, and may move the autonomous mobile body 10 to a side opposite to the noise source NS with respect to the user U that is the approach target as a center.

In this manner, the operation control unit 150 according to the present embodiment refers to the noise map, thus making it possible to grasp the noise source and the noise region accurately and move the autonomous mobile body 10 to a position where the input level of the target sound is increased and the input level of the non-target sound is decreased. According to the above-described motion control by the operation control unit 150 according to the present embodiment, it is possible to improve the SN ratio and effectively improve accuracy of voice recognition with respect to the target sound.

It is to be noted that the operation control unit 150 according to the present embodiment may not necessarily move the autonomous mobile body 10 to the side opposite to the noise source with respect to the approach target as a center. For example, in an example illustrated in FIG. 11, a wall exists in a straight line joining the noise source NS and the user U. In a case where an obstacle exists in a straight line joining the noise source and the approach target in this manner, the operation control unit 150 may stop the autonomous mobile body 10 at a position that is close to the above-described opposite side and does not enter the noise region NR. Even in this case, it is possible to achieve both an increase in the input level of the target sound and a decrease in the input level of the non-target sound and achieve an effect of improving the SN ratio. It is to be noted that the operation control unit 150 may grasp existence of an obstacle on the basis of information of a wall, furniture, and the like included in the noise map, and may perform motion control as described above on the basis of existence of an obstacle recognized by the recognition unit 120.

Figure 12:
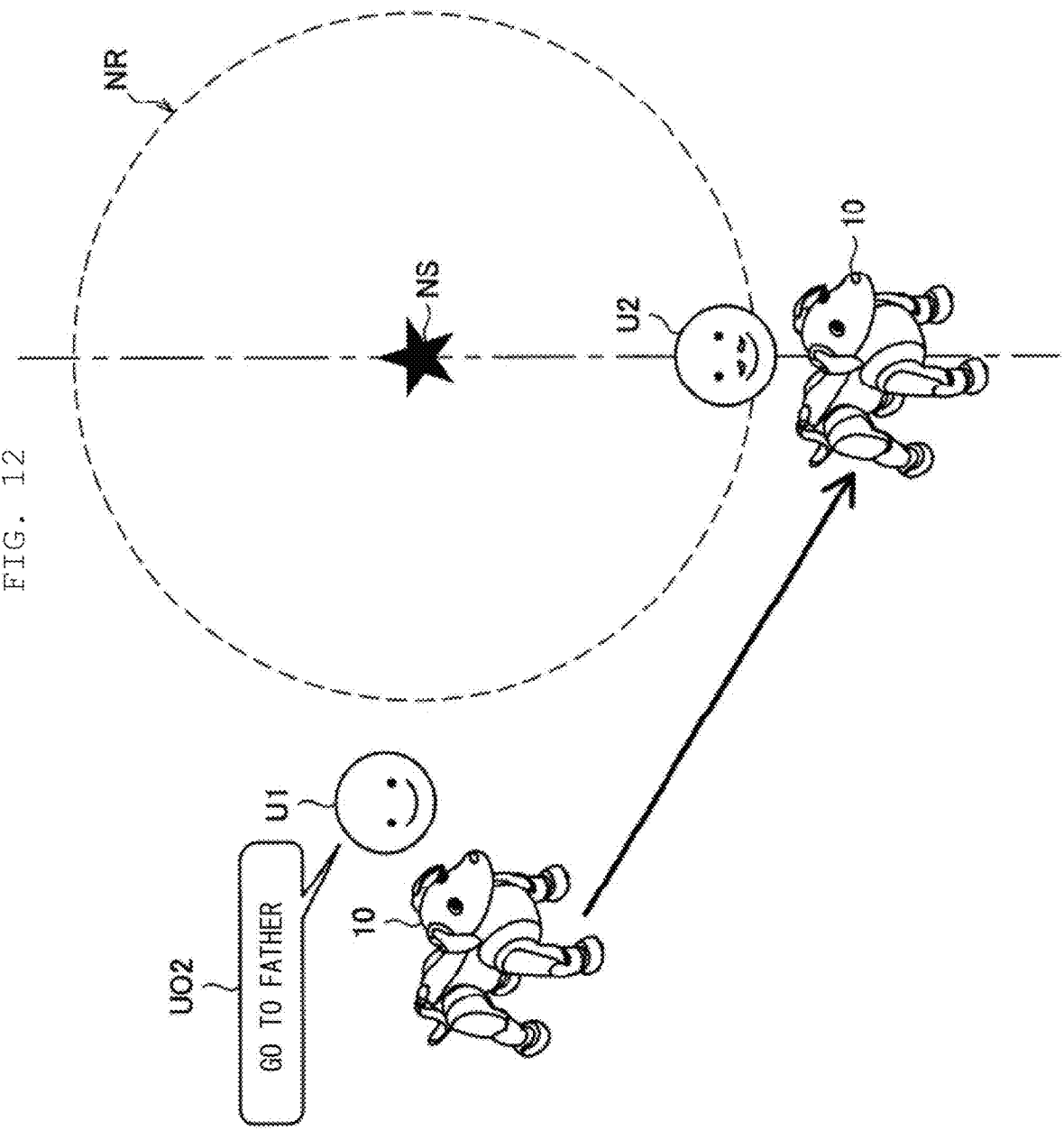
FIG. 12 is an explanatory diagram of motion control in a case where a approach target according to the same embodiment is not an uttering user.

Next, description is given of motion control in a case where the approach target according to the present embodiment is not an uttering user. FIG. 12 is an explanatory diagram of motion control in a case where the approach target according to the present embodiment is not an uttering user.

Figure 11:
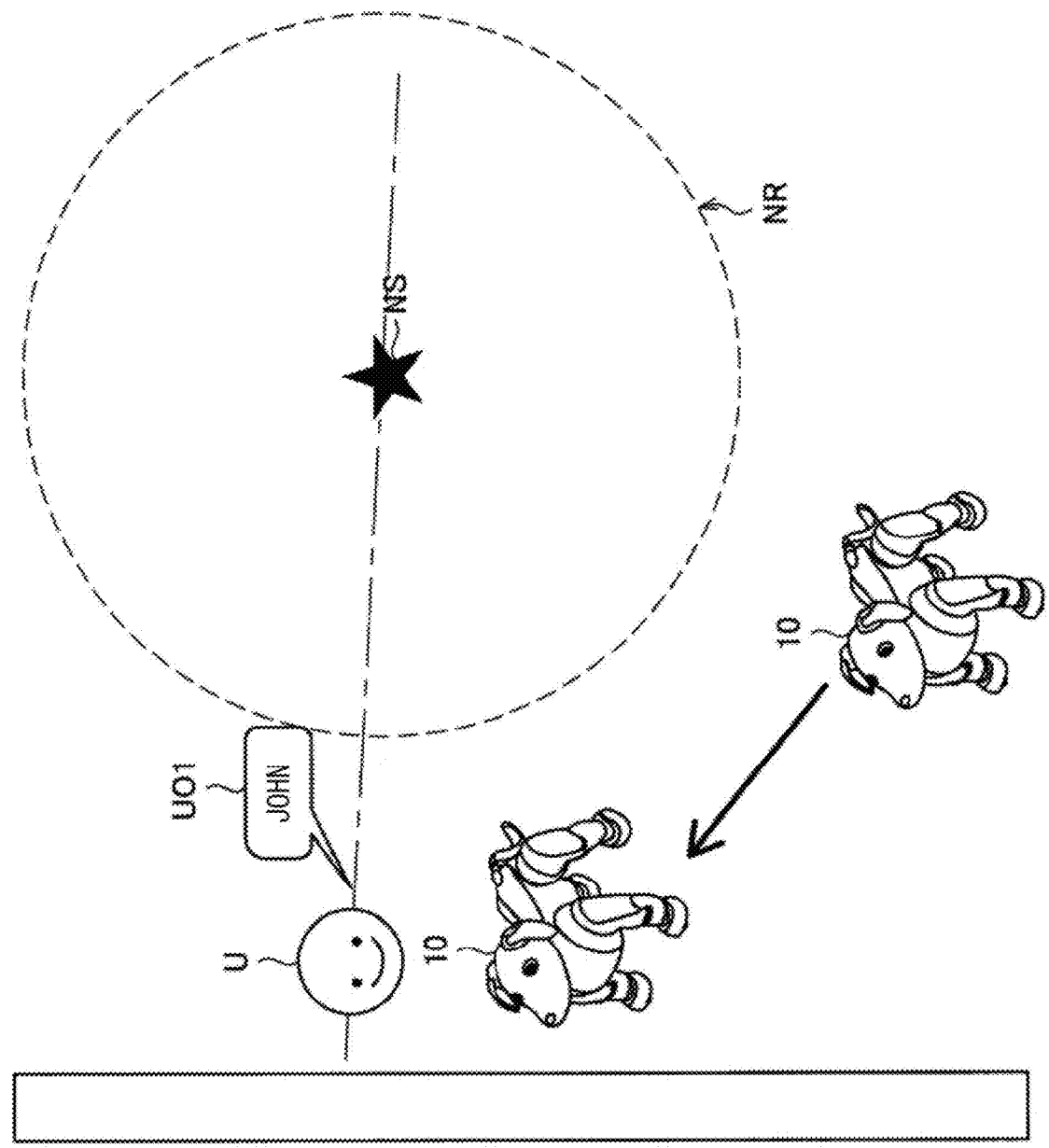
FIG. 11 is an explanatory diagram of motion control on the basis of the noise map in the case where the target sound according to the same embodiment is detected.

In an example illustrated in FIG. 12, unlike the examples illustrated in FIGS. 10 and 11, a user U1 is making a voice utterance UO2 that provides an instruction for movement not to the user U1 but to a user U2. At this time, the operation control unit 150 according to the present embodiment sets the user U2 as the approach target on the basis of the uttered voice UO2 recognized by the recognition unit 120 and controls the motion of the autonomous mobile body 10 to cause the autonomous mobile body 10 to approach the user U2.

In this manner, the approach target according to the present embodiment may be not only the uttering user who makes a voice utterance but also a moving body such as another user specified by voice recognition processing on the basis of the uttered voice, a fixed object such as a charging station, or any position.

Even in a case where the approach target is not the uttering user, the operation control unit 150 according to the present embodiment refers to the noise map similarly, thus making it possible to cause the autonomous mobile body 10 to execute movement in consideration of the noise source NS and the noise region NR. In the example illustrated in FIG. 12, the operation control unit 150 moves the autonomous mobile body 10 to the side opposite to the noise source NS with respect to the user U2 as a center. According to the above-described motion control by the operation control unit 150 according to the present embodiment, it is possible to effectively improve accuracy of voice recognition with respect to an uttered voice of the user U2 that is expected to be made hereafter, i.e., the target sound.

The description has been given above of motion control on the basis of the noise map according to the present embodiment. As described above, the operation control unit 150 according to the present embodiment refers to the noise map held by the surrounding environment holding unit 140 to thereby achieve movement of the autonomous mobile body 10 in consideration of not only the input level of the target sound but also the input level of the non-target sound and improve the SN ratio, which makes it possible to achieve voice recognition with high accuracy.

It is to be noted that the above has mainly described, by way of example, a case where the operation control unit 150 according to the present embodiment controls the autonomous mobile body 10 to move the autonomous mobile body 10 to the approach target on the basis of detection of the target sound; however, a trigger of movement in the present embodiment is not limited to such an example. The operation control unit 150 according to the present embodiment may perform control to move the autonomous mobile body 10 to the approach target on the basis of recognition of the face of the user or recognition of a gesture related to an instruction for movement by the user. Even in this case, referring to the noise map and moving the autonomous mobile body to a position where the input level of the non-target sound become lower makes it possible to enhance accuracy of voice recognition with respect to the target sound that is expected to be made hereafter.

<<2.3. Creation and Updating of Noise Map>>

Next, description is given of details of creation and updating of the noise map according to the present embodiment. The surrounding environment estimation unit 130 according to the present embodiment is able to create a noise map as described above on the basis of results of sound source direction estimation and sound pressure measurement, for example.

Figure 13:
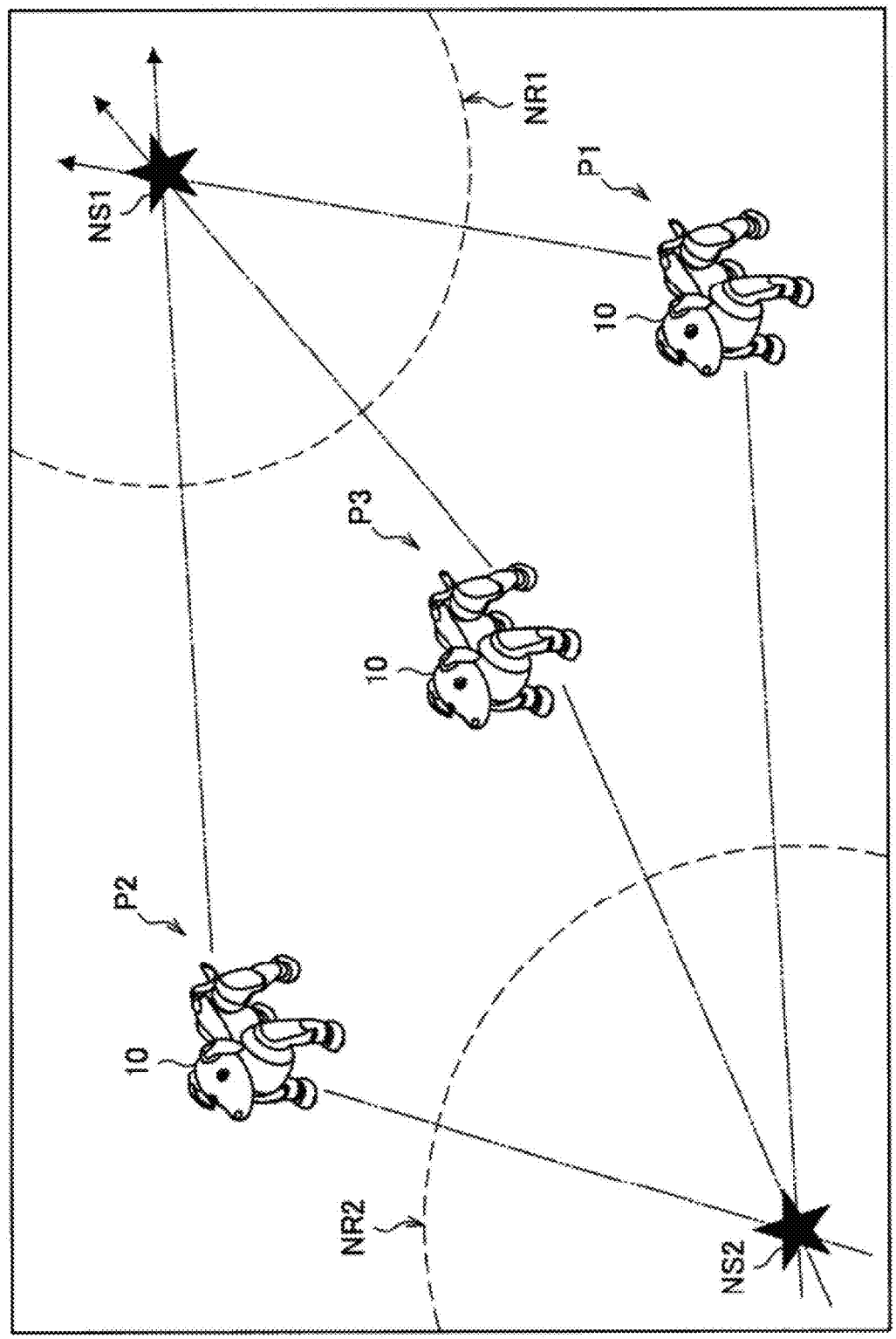
FIG. 13 is an explanatory diagram of creation of a noise map on the basis of sound source direction estimation according to the same embodiment.

First, description is given of creation of a noise map on the basis of sound source direction estimation according to the present embodiment. FIG. 13 is an explanatory diagram of creation of the noise map on the basis of the sound source direction estimation according to the present embodiment.

In creation of the noise map on the basis of the sound source direction estimation, the surrounding environment estimation unit 130 first performs sound localization at any given point to estimate a sound source direction. In an example illustrated in FIG. 13, the surrounding environment estimation unit 130 estimates respective directions of the noise sources NS1 and NS2 at a point P1. It is to be noted that at this point in time, it is possible to estimate the directions of the noise sources NS1 and NS2, but distances from the autonomous mobile body 10 to the noise sources NS1 and NS2 are unknown.

Subsequently, the surrounding environment estimation unit 130 moves to a point different from the previously estimated sound source direction, and performs sound localization again to estimate the sound source direction. In the example illustrated in FIG. 13, the surrounding environment estimation unit 130 estimates the respective directions of the noise sources NS1 and NS2 again at a point P2. At this time, the surrounding environment estimation unit 130 is able to estimate positions of the noise sources NS1 and NS2 in a space from a moving distance of the autonomous mobile body 10 and an intersection of the directions estimated at the points P1 and P2.

Thereafter, the surrounding environment estimation unit 130 repeats sound source direction estimation at still another point, which makes it possible to improve accuracy of estimation of a sound source position. In the example illustrated in FIG. 13, the surrounding environment estimation unit 130 estimates the directions of the noise sources NS1 and NS2 again at a point P3.

The surrounding environment estimation unit 130 according to the present embodiment repeats sound source direction estimation at a plurality of points in this manner, which makes it possible to estimate the positions of the noise sources NS1 and NS2 in a space with high accuracy, and create, for example a noise map in which regions located at predetermined distances from respective estimated positions are set as the noise regions NR1 and NR2.

Figure 14:
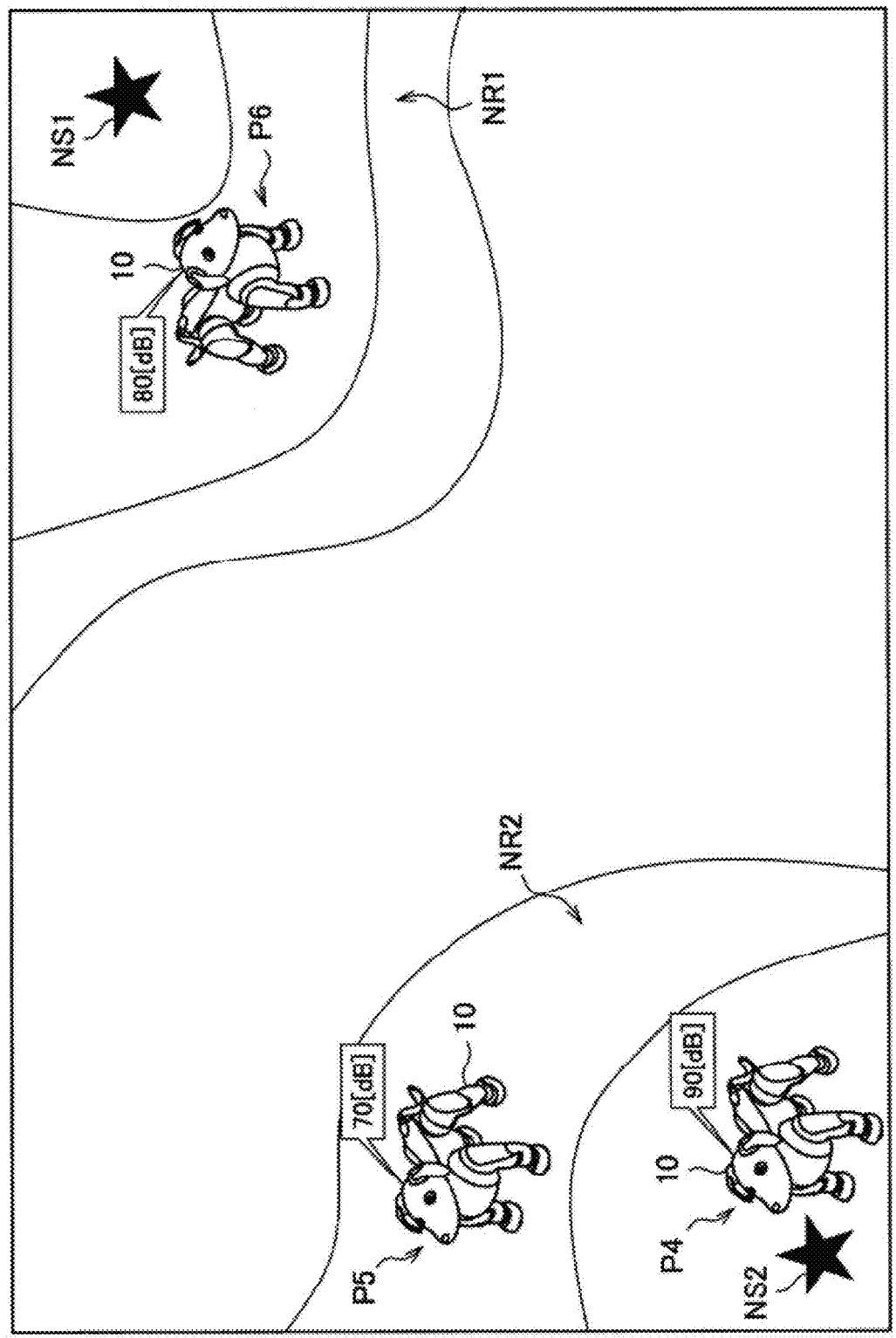
FIG. 14 is an explanatory diagram of creation of a noise map on the basis of sound source direction estimation according to the same embodiment.

Subsequently, description is given of creation of a noise map on the basis of sound pressure measurement according to the present embodiment. In a case where the autonomous mobile body 10 does not include a larger number of microphones than the number of source sources simultaneously generated, it is difficult to create the noise map on the basis of the above-described sound source direction estimation. In contrast, the surrounding environment estimation unit 130 according to the present embodiment is able to create the noise map on the basis of sound pressure measurement to be described below even in a case where the autonomous mobile body 10 includes only a single microphone. FIG. 14 is an explanatory diagram of creation of the noise map on the basis of the sound source direction estimation according to the present embodiment.

In creation of the noise map on the basis of the sound source direction estimation, the surrounding environment estimation unit 130 first executes measurement of a sound pressure level at any given point. In an example illustrated in FIG. 14, the surrounding environment estimation unit 130 measures a sound pressure level at a point P4. Subsequently, the surrounding environment estimation unit 130 repeatedly executes measurement of the sound pressure level at another point different from the point at which the measurement has been executed. In the example illustrated in FIG. 14, the surrounding environment estimation unit 130 executes measurement of the sound pressure level at points P5 and P6.

The surrounding environment estimation unit 130 according to the present embodiment repeats sound pressure measurement at a plurality of points in this manner, which makes it possible to estimate isobars of the sound pressure level as illustrated in FIG. 14 and set a region in which the sound pressure level is equal to or greater than a threshold value as a noise region. In addition, the surrounding environment estimation unit 130 is able to estimate a point having the highest sound pressure level in the noise region as the position of the noise source. In the example illustrated in FIG. 14, the surrounding environment estimation unit 130 sets the noise regions NR1 and NR2 on the basis of estimated isobars, and estimates the positions of the noise sources NS1 and NS2.

According to the surrounding environment estimation unit 130 according to the present embodiment, even in case where the autonomous mobile body 10 includes only a single microphone, repeatedly executing sound pressure measurement at a plurality of points in this manner makes it possible to create a noise map with high accuracy. It is to be noted that, in a case where creation of a noise map on the basis of the sound pressure measurement is performed, it is necessary to separate the target sound and the non-target sound, but such separation is achievable by the above-described function of the recognition unit 120.

Figure 15:
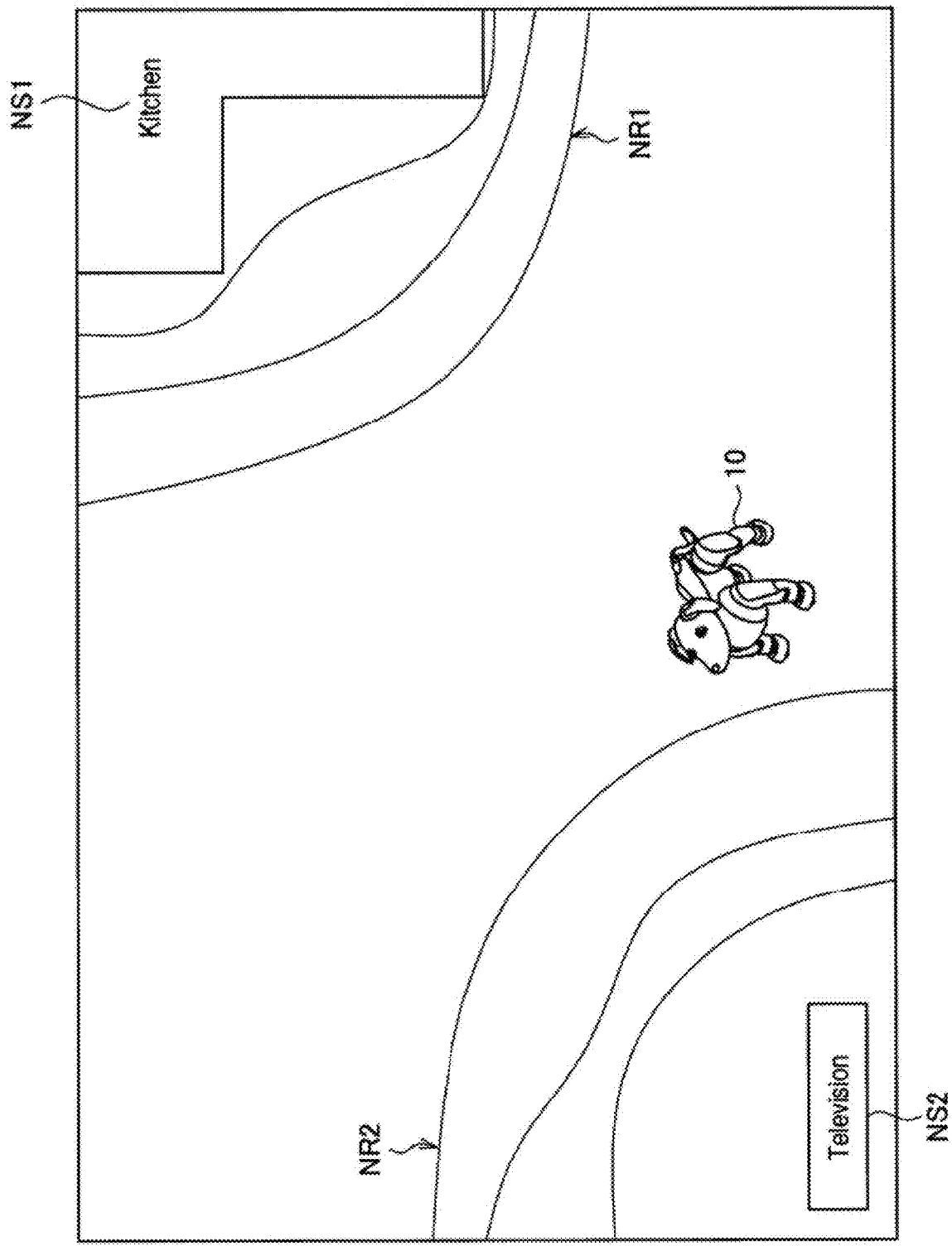
FIG. 15 illustrates an example of a noise map including type information of noise sources according to the same embodiment.

In addition, the noise map according to the present embodiment may include information such as type of noise source. FIG. 15 illustrates an example of a noise map including type information of the noise sources according to the present embodiment. As can be seen from the example illustrated in FIG. 15, information of the noise map include that the noise sources NS1 and NS2 are respectively a kitchen and a television.

The surrounding environment estimation unit 130 according to the present embodiment is able to create a noise map including type information of the noise sources as illustrated in FIG. 15 on the basis of a result of object recognition by the recognition unit 120, for example. According to the above-described function of the surrounding environment estimation unit 130 according to the present embodiment, the operation control unit 150 is able to perform motion control with high accuracy in accordance with identification of the noise source.

One example of noise map creation according to the present embodiment has been described above. Subsequently, description is given of a timing of creation or updating of the noise map according to the present embodiment.

For example, a case is presumed where updating of the noise map is performed constantly dynamically. In this case, while it is possible to detect the non-target sounds generated in the surroundings without fail, information such as a sporadic sound that is not useful for the motion control by the operation control unit 150 is all included as information of the noise map. In addition, in a case where updating of the noise map is executed constantly dynamically, a calculation amount becomes enormous; therefore, high-performance processor or the like is necessary.

Accordingly, the surrounding environment estimation unit 130 according to the present embodiment may execute noise map creation processing and updating processing only under a highly effective condition in collection of the non-target sound. Here, the above-described highly effective condition includes circumstances under which a large number of non-target sounds may be generated. In addition, the circumstances under which a large number of non-target sounds may be generated include circumstances under which the user carries out activity in a space. Accordingly, the surrounding environment estimation unit 130 according to the present embodiment may execute the noise map creation processing and updating processing at a timing at which the user exists in a space where the autonomous mobile body 10 is installed.

At this time, the surrounding environment estimation unit 130 according to the present embodiment is able to estimate absence or existence of the user on the basis of a schedule of the user and various types of sensor information, and execute the noise map creation processing and updating processing only in a condition in which the user is highly likely to exist.

FIG. 16 is a setting example of execution conditions for the noise map creation processing and updating processing according to the present embodiment. In the example illustrated in FIG. 16, whether or not to execute creation processing and updating processing is set for each combination of factors such as the schedule of the user (not at home or at home), detection or non-detection of a key sound, detection or non-detection of door opening/closing noise, detection or non-detection of an utterance such as "I'm home", detection or non-detection of a moving body by the human detection sensor. It is to be noted that FIG. 16 illustrates an example in which the processing is executed only in a case where it is determined from all the above-described factors that the user exists in the same space as the autonomous mobile body 10.

It is to be noted that such propriety of execution as descried above may be settable dynamically in accordance with the features and circumstances of the autonomous mobile body 10. Thus, according to the surrounding environment estimation unit 130 according to the present embodiment, creating or updating the noise map on the basis of the non-target sounds collected in a time zone in which the user exists in a surrounding environment makes it possible to hold a highly accurate noise map.

Next, description is given of noise map updating processing according to the present embodiment. As described above, the surrounding environment estimation unit 130 according to the present embodiment is able to dynamically update the noise map on the basis of the non-target sounds collected in the time zone in which the user exists in the surrounding environment.

However, in this case, at a timing at which sound collection is performed, a case is also presumed where a different non-target sound is generated. Accordingly, in a case where the noise map is updated simply on the basis of the latest sound collection data, information of a non-target sound that is intrinsically less influenced, such as a sporadic sound is included in the noise map, which may cause a decrease in accuracy of motion control by the operation control unit 150.

Accordingly, the noise map may be updated not by overwriting the existing noise map on the basis of the latest sound collection data but by integrating the latest sound collection data into the existing noise map.

Figure 17:
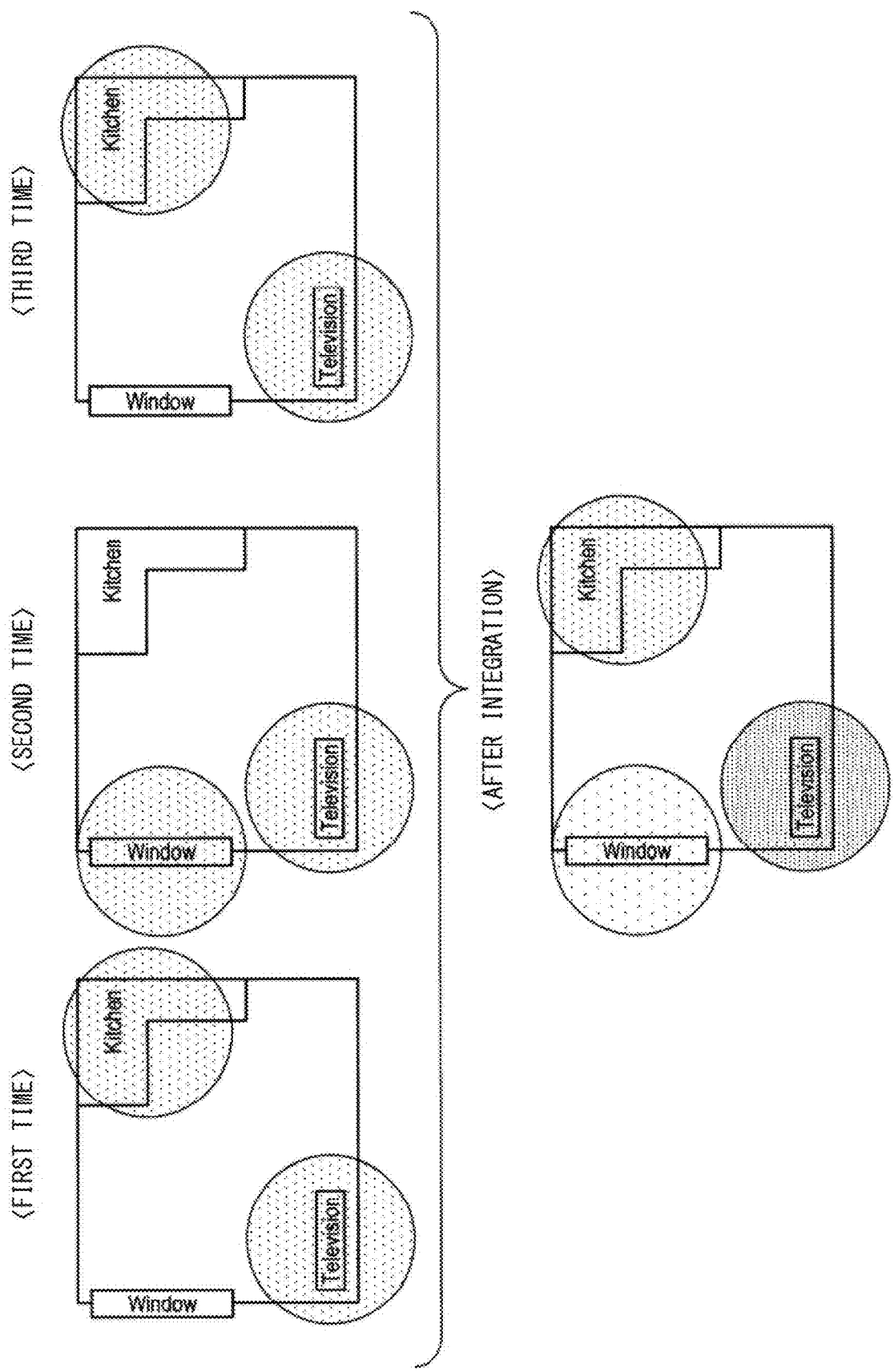
FIG. 17 is an explanatory diagram of noise map integration processing according to the same embodiment.

FIG. 17 is an explanatory diagram of noise map integration processing according to the present embodiment. In an example illustrated in FIG. 17, the surrounding environment estimation unit 130 according to the present embodiment performs noise map integration on the basis of three times of sound collection. Here, a case is presumed where the non-target sounds related to the kitchen and the television are detected in the first sound collection; non-target sounds related to a window and the television are detected in the second sound collection; and non-target sounds related to the kitchen and the television are detected in the third sound collection.

In this case, for example, the surrounding environment estimation unit 130 according to the present embodiment may integrate sound collection data for three times by averaging or the like to update the noise map. According to the surrounding environment estimation unit 130 according to the present embodiment, as illustrated in FIG. 17, it is possible to reflect the frequency of generation of each non-target sound or the like on the noise map, which makes it possible to reduce an influence of the non-target sound that is not frequently generated, such as a sporadic sound. It is to be noted that in the example illustrated in FIG. 17, the frequency of generation of the non-target sound is indicated by high and low densities of hatching (the higher the density is, the higher the frequency of generation becomes). In this case, the operation control unit 150 may control movement of the autonomous mobile body 10 to more intensively avoid the television that frequently generates the non-target sound.

The description has been given above of creation and updating of the noise map according to the present embodiment. It is to be noted that the techniques described above are merely examples, and creation and updating of the noise map according to the present embodiment are not limited to the examples.

Figure 18:
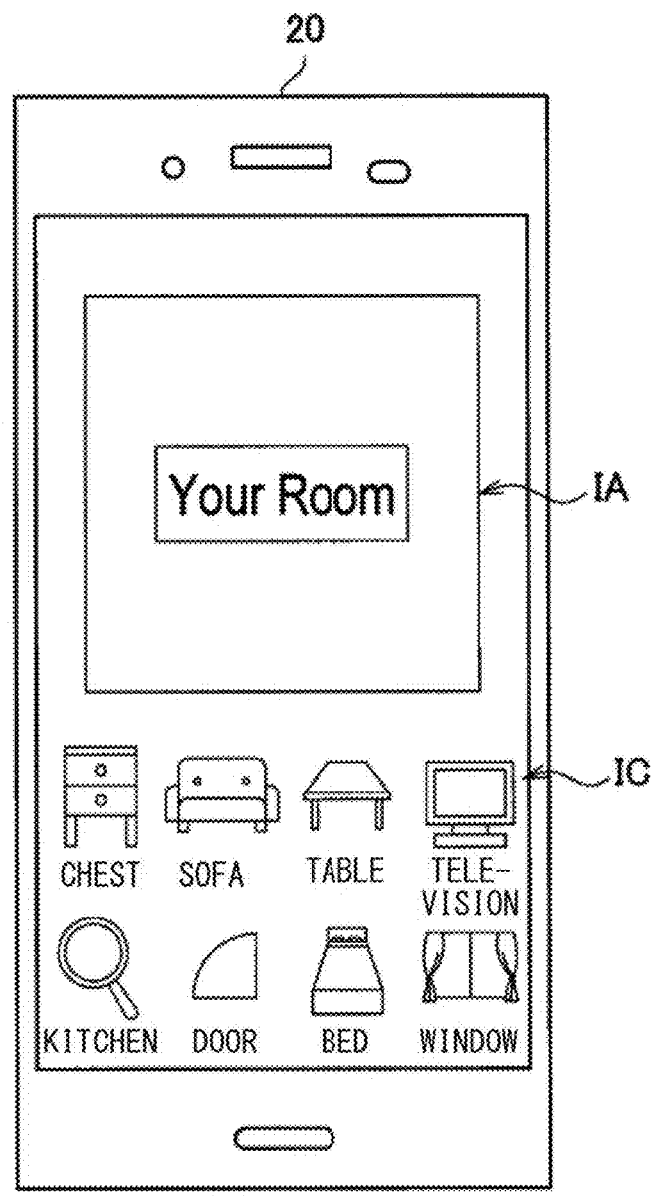
FIG. 18 is an explanatory diagram of creation and updating of a noise map on the basis of user input according to the same embodiment.
Figure 19:
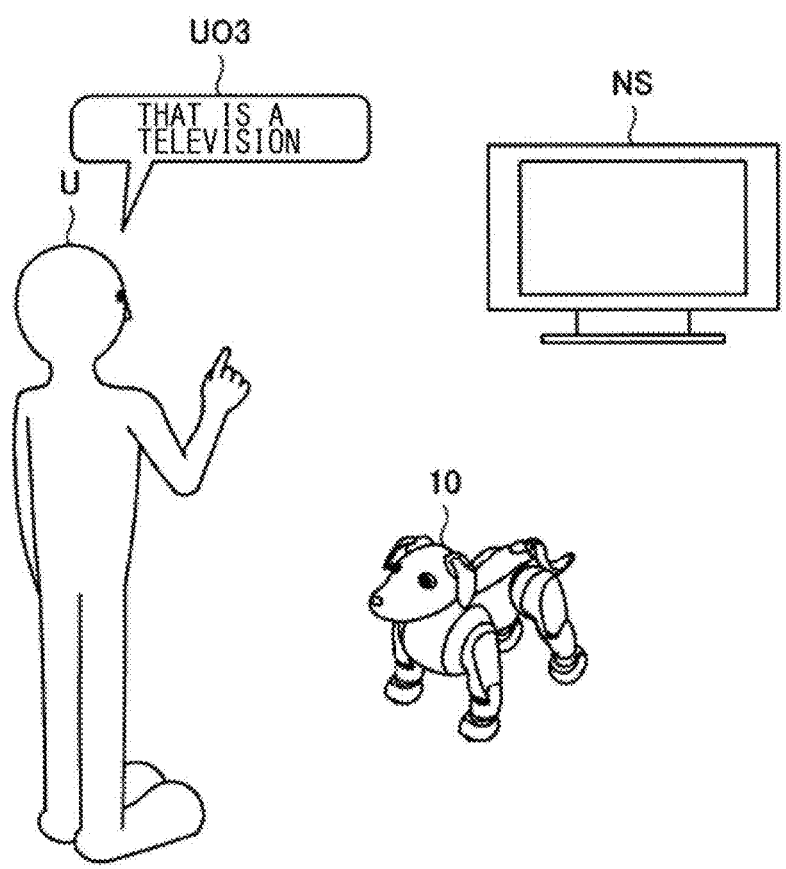
FIG. 19 is an explanatory diagram of creation and updating of the noise map on the basis of user input according to the same embodiment.

The surrounding environment estimation unit 130 according to the present embodiment may perform creation and updating of the noise map on the basis of information inputted by the user, for example. FIG. 18 and FIG. 19 are explanatory diagrams of creation and updating of the noise map on the basis of user input according to the present embodiment.

For example, the surrounding environment estimation unit 130 according to the present embodiment may perform creation and updating of the noise map on the basis of furniture layout information inputted by the user via an information processing terminal 20 or the like, as illustrated in FIG. 18. At this time, the surrounding environment estimation unit 130 is able to request to dispose an icon IC corresponding to each piece of furniture in an input region IA simulating a room of the user in a display section included in the information processing terminal 20, and to execute creation and updating of the noise map on the basis of inputted information.

In addition, for example, the surrounding environment estimation unit 130 according to the present embodiment is able to identify the noise source NS on the basis of a gesture such as finger pointing to be performed by the user U and an uttered voice UO3 for teaching of the noise source and reflect the identified noise source NS on the noise map.

<<2.4. Motion Control on Basis of Noise Source Avoidance Priorities>>

Next, description is given of motion control on the basis of noise source avoidance priorities according to the present embodiment. The description has been given above of a case where the operation control unit 150 according to the present embodiment refers to the noise map, and controls movement of the autonomous mobile body 10 to avoid the noise region.

Figure 20:
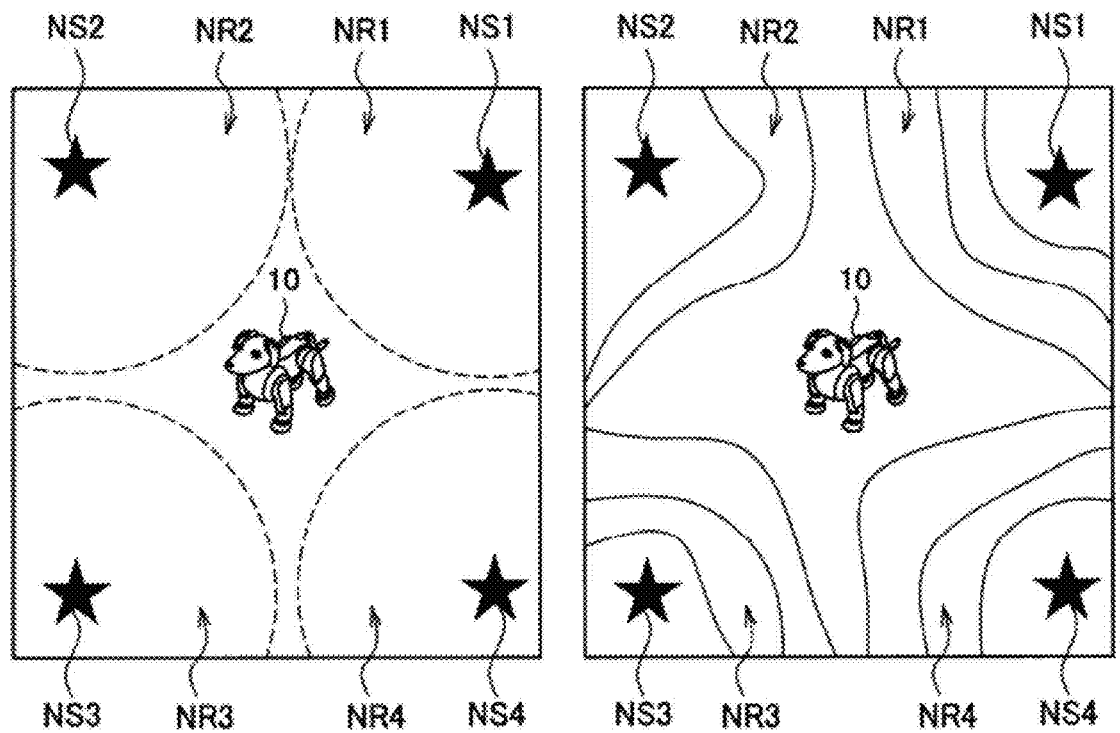
FIG. 20 illustrates an example of circumstances under which it is difficult to avoid a noise region according to the same embodiment.

However, a case is presumed where depending on circumstances, it is difficult to perform movement while avoiding the noise region in some cases. FIG. 20 illustrates an example of circumstances under which avoidance of the noise region according to the present embodiment is difficult. A left side of FIG. 20 illustrates a noise map on the basis of sound source direction estimation, and a right side of FIG. 20 illustrates a noise map on the basis of sound pressure measurement. Here, as can be seen from both the noise maps, the autonomous mobile body 10 is surrounded by the noise regions NR1 to NR4 in both the noise maps, and movement to another location is difficult.

In such a case, the operation control unit 150 according to the present embodiment may control the autonomous mobile body 10 to move the autonomous mobile body 10 to a noise region corresponding to a noise source of a lower avoidance priority on the basis of avoidance priorities assigned to the noise sources NS1 to NS4.

Here, the avoidance priorities according to the present embodiment may be determined by types and features of non-target sounds generated by noise sources, for example. As described above, the non-target sounds according to the present embodiment include various types of sounds other than the target sound. Meanwhile, influences of the non-target sounds exerted on accuracy of voice recognition with respect to the target sound are different depending on features of the non-target sounds.

Accordingly, the surrounding environment estimation unit 130 according to the present embodiment may classify the non-target sounds on the basis of magnitude of influence degree on accuracy of voice recognition, and create a noise map in which the avoidance priorities are set in the decreasing order of the influence degree.

Here, an example is described in which non-targets are classified into four categories 1 to 4. For example, the category 1 may include a non-target sound that has a relatively large sound volume and is not the target sound while being a human voice. Examples of the category 1 include voices outputted from a television, a radio, and any other apparatus, music including vocals, conversation among third parties other than the user, and the like. The category 1 may include a non-target sound having the highest influence on accuracy of voice recognition and being of the highest avoidance priority among the four categories.

In addition, the category 2 may include a non-target sound that is generated unsteadily and has a relatively large sound volume, thus making it difficult to sufficiently achieve an effect of suppressing noise. Examples of the category 2 include working sounds such as dish washing and cooking, outdoor sounds coming from an open window, and the like. The category 2 may include a non-target sound having the second highest influence on accuracy of voice recognition and being of the second highest avoidance priority among the four categories.

In addition, the category 3 may include a non-target sound that is generated steadily, thus making it relatively easy to achieve the effect of suppressing noise. Examples of the category 3 include sounds generated by an air conditioner, an exhaust fan, a PC fan, and the like. The category 2 may include a non-target sound having the third highest influence on accuracy of voice recognition and being of the third highest avoidance priority among the four categories.

In addition, the category 4 may include a non-target sound that is generated sporadically and has only an instantaneous influence. Examples of the category 4 include door opening/closing noise, a footstep sound, a sound generated by a microwave oven, and the like The category 4 may include a non-target sound having the lowest influence on accuracy of voice recognition and being of the lowest avoidance priority among the four categories.

Thus, the surrounding environment estimation unit 130 according to the present embodiment is able to create a noise map in which the avoidance priorities are set in accordance with the features of the non-target sounds.

In addition, the noise source avoidance priorities according to the present embodiment may be set on the basis of an acoustic and some sort of quantitative index related to the non-target sound. Examples of the quantitative index described above include an index indicating a degree of sound likelihood, and an index indicating a degree of stationarity.

In general, the target sound that is a target for voice recognition, i.e., the uttered voice of the user is a "non-stationary" "voice". Meanwhile, examples of the "non-stationary" "voice" also include non-target sounds such as conversation among third parties and voices outputted from a television and a radio. Accordingly, to improve accuracy of voice recognition with respect to the target sound that is the "non-stationary" "voice", it is important to avoid the non-target sound that is the "non-stationary" "voice" that is difficult to be separated from the target sound.

Meanwhile, "non-stationary" "non-voices" include working sounds of dish washing and cooking, and the like, and "stationary" "non-voices" include sounds outputted from an air conditioner, an exhaust fan, and a PC fan, and the like. However, such non-target sounds are relatively easily separated from the target sound; therefore, it can be said that the non-target sounds are of a lower avoidance priority, as compared with the non-target sound that is the "non-stationary" "voice" described above.

In addition, a "stationary" "voice" corresponds to, for example, a case where the same sound is uttered long and continuously, such as "Ahhhh"; however, such a sound is extremely unlikely to be generated in daily life, and may be therefore ignored.

As described above, the surrounding environment estimation unit 130 according to the present embodiment may calculate influence degrees of the non-target sounds exerted on voice recognition with respect to the target sound on the basis of an index α indicating a degree of sound likelihood and an index β indicating a degree of stationarity, and set the avoidance priorities on the basis of thus-calculated values.

Figure 21:
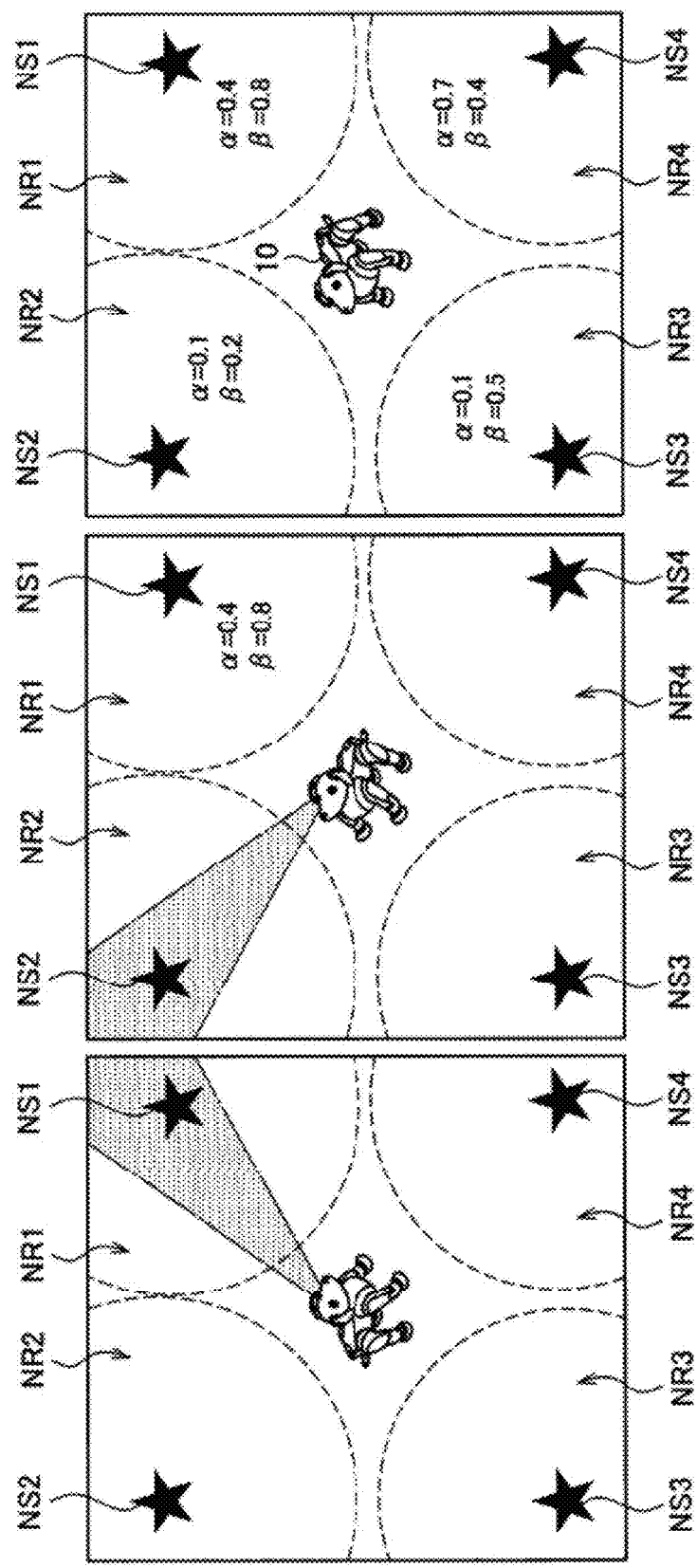
FIG. 21 is an explanatory diagram of calculation of an index $\alpha$ indicating a degree of sound likelihood and an index $\beta$ indicating a degree of stationarity according to the same embodiment.
Figure 22:
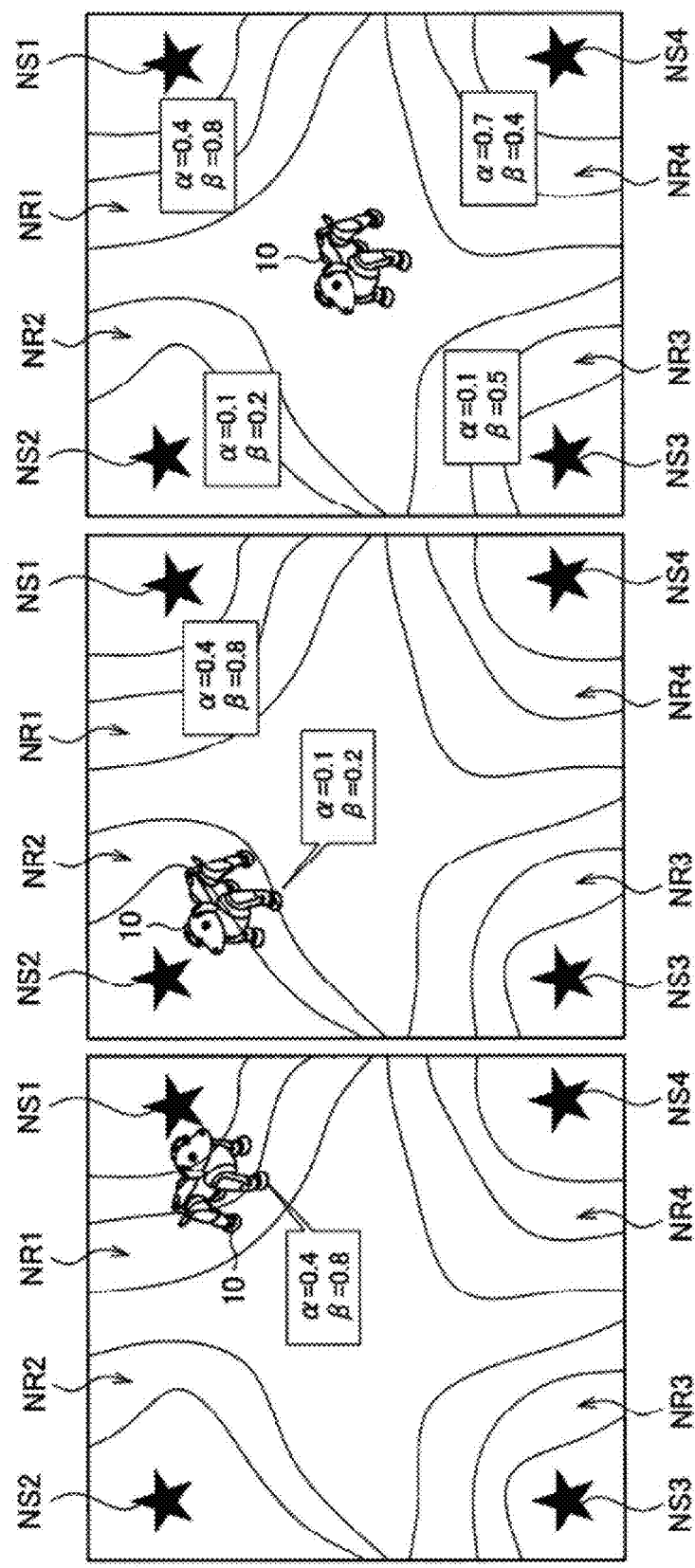
FIG. 22 is an explanatory diagram of calculation of the index a indicating the degree of sound likelihood and the index $\beta$ indicating the degree of stationarity according to the same embodiment.

FIG. 21 and FIG. 22 are explanatory diagrams of calculation of the index a indicating the degree of sound likelihood and the index β indicating the degree of stationarity according to the present embodiment. FIG. 21 illustrates a flow of calculation in a case where the autonomous mobile body 10 according to the present embodiment includes a plurality of microphones.

In a case where the autonomous mobile body 10 includes a plurality of microphones, as illustrated in FIG. 21, the surrounding environment estimation unit 130 executes beamforming in order toward directions of the noise sources NS1 to NS4 and calculates the index α and the index β. According to such a technique, it is possible to calculate the index a and the index of each of the noise sources NR1 to NR4 without entering the noise regions NR1 to NR4; therefore, even in a case where the target sound is detected during calculation, it is possible to maintain accuracy of voice recognition with respect to the target sound.

In addition, FIG. 22 illustrates a flow of calculation in a case where the autonomous mobile body 10 according to the present embodiment includes a single microphone. In a case where the autonomous mobile body 10 includes a single microphone, as illustrated in FIG. 22, the surrounding environment estimation unit 130 may calculate the index α and the index β around each of the noise sources NS1 to NS4. It is to be noted that in a case where calculation of the index α and the index β of each noise source is completed, the operation control unit 150 may control the autonomous mobile body 10 to cause the autonomous mobile body 10 to immediately escape from the noise regions NR1 to NR4.

The description has been given above of the flow of calculation of the index α and the index β according to the present embodiment. The surrounding environment estimation unit 130 according to the present embodiment is able to calculate the influence degree of each of noise sources on the basis of the index a and the index β calculated as described above and set avoidance priorities on the basis of the influence degrees. For example, a total value of the index α and the index β may be defined as the influence degree, and the surrounding environment estimation unit 130 may set avoidance priorities in the decreasing order of the total values.

It is to be noted that the surrounding environment estimation unit 130 according to the present embodiment may calculate the index a indicating the degree of sound likelihood on the basis of sound spectral entropy, for example. The sound spectral entropy is an index used for a VAD (Voice Activity Detection) technology, and a human voice tends to have a lower value, as compared with other sounds.

The surrounding environment estimation unit 130 according to the present embodiment is able to calculate sound spectral entropy, i.e., the index α by the following mathematical expression (1). It is to be noted that f in the mathematical expression (1) indicates a frequency, and $S_f$ indicates an amplitude spectrum of the frequency f of an observation signal. In addition, $P_f$ in the mathematical expression (1) is defined by the following mathematical expression (2).

[Math. 1]

$$\alpha = -\sum_f P_f \cdot \log P_f \quad (1)$$

$$P_f = \frac{S_f}{\sum_f S_f} \quad (2)$$

In addition, the surrounding environment estimation unit 130 according to the present embodiment may calculate the index β indicating the degree of stationarity on the basis of a sound kurtosis, for example. The sound kurtosis is an index frequently used to discriminate between stationarity and non-stationarity of a sound, and may be calculated by the following mathematical expression (3). It is to be noted that T in the following mathematical expression (3) indicates a length of a sound segment where a kurtosis is calculated, and a length such as three to five seconds may be set. In addition, t in the mathematical expression (3) indicates a certain time, and x(t) indicates a voice waveform at the time t.

[Math. 2]

$$\beta = \frac{\sum_{t=1}^{T} x(t)^4}{\left(\sum_{t=1}^{T} x(t)^2\right)^2} - 3 \quad (3)$$

The description has been given above of setting of noise source avoidance priorities according to the present embodiment. According to setting of avoidance priorities according to the present embodiment, the autonomous mobile body 10 is able to avoid the non-target sound that exerts an influence on voice recognition with respect to the target sound on a priority basis.

<<2.5. Flow of Motion>>

Figure 23:
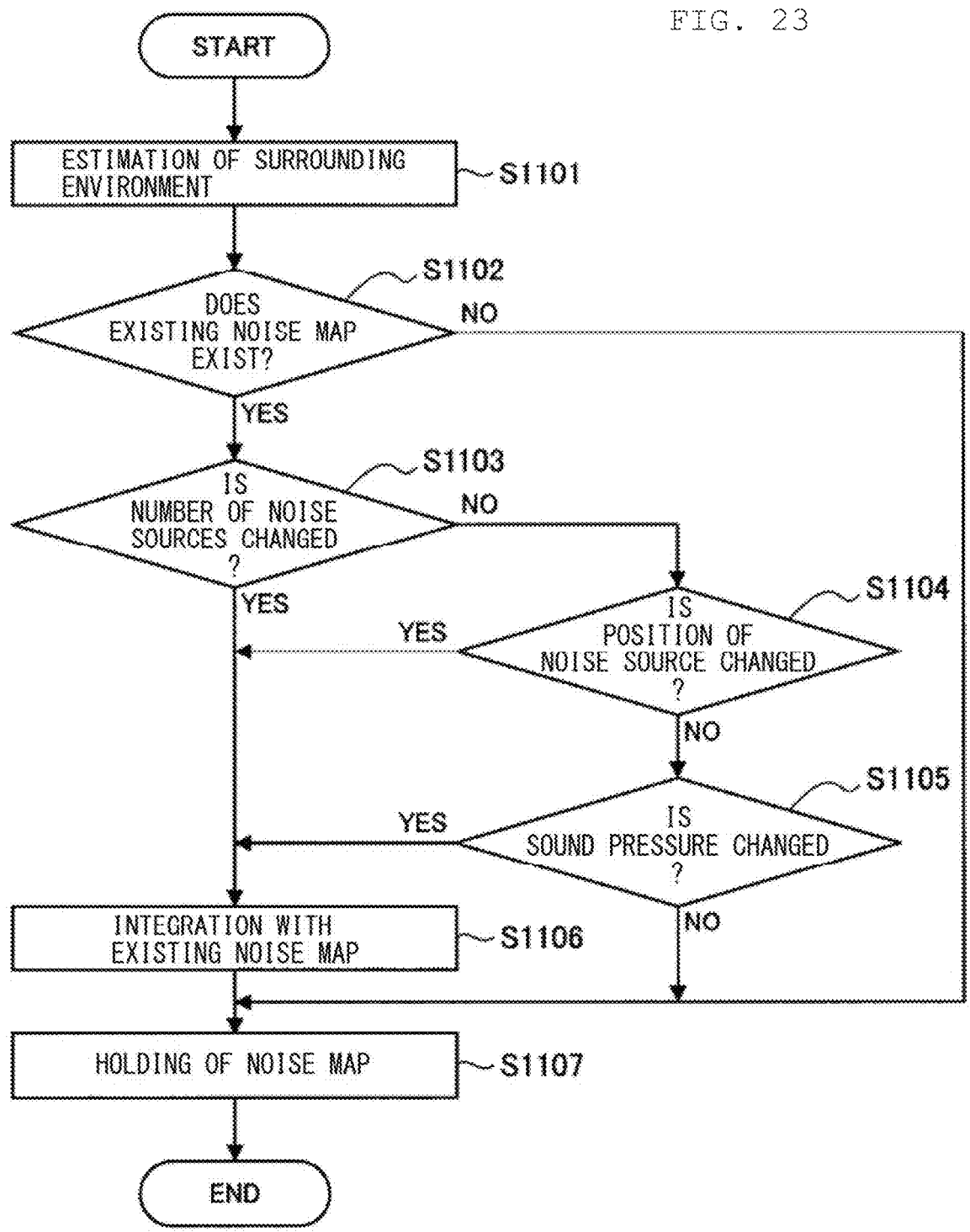
FIG. 23 is a flowchart illustrating a flow of noise map updating according to the same embodiment.

Next, description is given of details of a flow of the motion of the autonomous mobile body 10 according to the present embodiment. First, description is given of a flow of updating of the noise map according to the present embodiment. FIG. 23 is a flowchart illustrating a flow of noise map updating according to the present embodiment.

Referring to FIG. 23, first, the surrounding environment estimation unit 130 estimates a surrounding environment on the basis of sensor information collected by the input unit 110 and a recognition result by the recognition unit 120 (S1101). Specifically, the surrounding environment estimation unit 130 estimates a noise source and a noise region.

Next, the surrounding environment estimation unit 130 determines whether or not the surrounding environment holding unit 140 holds an existing noise map (S1102).

Here, in a case where the noise map held by the surrounding environment holding unit 140 does not exist (S1102: NO), the surrounding environment estimation unit 130 creates a noise map on the basis of the surrounding environment estimated in the step S1101 and stores the noise map in the surrounding environment holding unit 140 (S1107).

Meanwhile, in a case where the existing noise map exists in the surrounding environment holding unit 140 (S1102: YES), the surrounding environment estimation unit 130 next determines whether or not the number of noise sources in the estimated surrounding environment is changed from the number of noise sources in the existing noise map (S1103).

Here, in a case where the number of noise sources is changed (S1103: YES), the surrounding environment estimation unit 130 integrates the noise map on the basis of the surrounding environment estimated in the step S1101 (S1106), and stores the integrated noise map in the surrounding environment holding unit 140 (S1107).

Meanwhile, in a case where the number of noise sources is not changed (S1103: NO), the surrounding environment estimation unit 130 next determines whether or not the position of the noise source in the estimated surrounding environment is changed from the position of the noise source in the existing noise map (S1104).

Here, in a case where the position of the noise source is changed (S1104: YES), the surrounding environment estimation unit 130 integrates the noise map on the basis of the surrounding environment estimated in the step S1101 (S1106), and stores the integrated noise map in the surrounding environment holding unit 140 (S1107).

Meanwhile, in a case where the position of the noise source is not changed (S1104: NO), the surrounding environment estimation unit 130 next determines whether or not a sound pressure of a non-target sound emitted by the noise source in the estimated surrounding environment is changed from the sound pressure of the non-target sound in the existing noise map (S1105).

Here, in a case where the sound pressure of the non-target sound emitted by the noise source is changed (S1105: YES), the surrounding environment estimation unit 130 integrates the noise map on the basis of the surrounding environment estimated in the step S1101 (S1106), and stores the integrated noise map in the surrounding environment holding unit 140 (S1107).

Meanwhile, in a case where the sound pressure of the non-target sound emitted by the noise source is not changed (S1105: NO), the surrounding environment estimation unit 130 does not update the noise map and maintains the existing noise map in the surrounding environment holding unit 140.

Next, description is given of details of a flow of motion control according to the present embodiment. FIG. 24 is a flowchart illustrating a flow of motion control according to the present embodiment.

Referring to FIG. 24, the operation control unit 150 first reads the noise map held by the surrounding environment holding unit 140 (S1201).

Subsequently, the operation control unit 150 causes the autonomous mobile body 10 to perform an autonomous action avoiding the noise region, on the basis of the noise map read in the step S1201 (S1202).

In addition, the operation control unit 150 continuously determines whether or not the target sound is detected during the autonomous action in the step S1202 (S1203).

Here, in a case where the target sound is detected (S1203: YES), the operation control unit 150 moves the autonomous mobile body 10 to a position where the input level of the non-target sound becomes lower, around the approach target, on the basis of the noise map read in the step S1201 (S1204).

Next, the operation control unit 150 causes the autonomous mobile body 10 to execute a corresponding motion on the basis of a result of voice recognition of the target sound (S1205).

The description has been given above of the flow of the motion of the autonomous mobile body 10 according to the present embodiment. It is to be noted that the above has mainly described that, to improve the SN ratio, the autonomous mobile body 10 according to the present embodiment performs movement in consideration of the input levels of the target sound and the non-target sound. However, a technique for improving the SN ratio according to the present embodiment is not limited to such an example, and may be used in combination with signal processing or beamforming technology, for example.

For example, the operation control unit 150 according to the present embodiment may move the autonomous mobile body 10 to a position between the approach target and the noise source and perform control to extend beamforming toward the direction of the approach target. In a case where the autonomous mobile body 10 is a dog-type robot device, the operation control unit 150 may perform control to extend beamforming at an elevation angle corresponding to the height of the face of the user that is the approach target. In this case, an effect of effectively eliminating a non-target sound arrived from a horizontal direction to effectively improve the SN ratio is expected.

In addition, to avoid the noise region, the operation control unit 150 according to the present embodiment may cause the autonomous mobile body 10 to perform a motion for guiding the user, for example. For example, in a case where the user that is the approach target exists in the noise region, the operation control unit 150 causes the autonomous mobile body 10 to perform a motion for guiding the user to move away from the noise region and approach the autonomous mobile body 10, which makes it possible to increase the input level of the target sound without entering the noise region. For example, the above-described guiding may be implemented by a motion such as barking, stopping in front of the noise region, and prowling. In addition, in a case where the autonomous mobile body 10 has a verbal communication function like a humanoid robot device, for example, the autonomous mobile body 10 may explicitly provide notification of wanting to move away from the noise region by voice.

3. Conclusion

As described above, the autonomous mobile body 10 that is one example of the information processor according to an embodiment of the present disclosure includes the operation control unit 150 that controls the motion of the autonomous mobile body 10 on the basis of recognition processing. In addition, one of the features of the operation control unit 150 according to an embodiment of the present disclosure is to move the autonomous mobile body 10 to a position where the input level of the non-target sound that is not the target voice becomes lower, around the approach target that is determined on the basis of the target sound in a case where the target sound that is a target voice for voice recognition processing is detected. According to such a configuration, it is possible to cause the autonomous mobile body to execute a motion for further improving accuracy of sound recognition.

Although the description has been given above in detail of preferred embodiments of the present disclosure with reference to the accompanying drawings, the technical scope of the present disclosure is not limited to such examples. It is obvious that a person having ordinary skill in the art of the present disclosure may find various alterations or modifications within the scope of the technical idea described in the claims, and it should be understood that these alterations and modifications naturally come under the technical scope of the present disclosure.

In addition, the effects described herein are merely illustrative or exemplary, and are not limitative. That is, the technology according to the present disclosure may achieve, in addition to or in place of the above effects, other effects that are obvious to those skilled in the art from the description of the present specification.

In addition, respective steps of the series of processing of the autonomous mobile body 10 in the present specification need not necessarily be processed in chronological order illustrated in the flowcharts. For example, the respective steps of the series of processing of the autonomous mobile body 10 may be processed in an order different from the order illustrated in the flowcharts, or may be processed in parallel.

It is to be noted that the technical scope of the present disclosure also includes the following configurations.

(1)

An information processor including:

an operation control unit that controls a motion of an autonomous mobile body acting on the basis of recognition processing, in a case where a target sound that is a target voice for voice recognition processing is detected, the operation control unit moving the autonomous mobile body to a position, around an approach target, where an input level of a non-target sound that is not the target voice becomes lower, the approach target being determined on the basis of the target sound.

(2)

The information processor according to (1), in which in a case where the target sound is detected, the operation control unit moves the autonomous mobile body to a position, around the approach target determined on the basis of the target sound, where an input level of the target sound becomes higher and the input level of the non-target sound becomes lower.

(3)

The information processor according to (1) or (2), in which in a case where the target sound is detected, the operation control unit moves the autonomous mobile body to a position farther away from a noise source that emits the non-target sound and closer to the approach target.

(4)

The information processor according to any one of (1) to (3), in which in a case where the target sound is detected, the operation control unit moves the autonomous mobile body to a side opposite to a noise source that emits the non-target sound with respect to the approach target as a center.

(5)

The information processor according to any one of (1) to (4), in which the target sound includes an uttered voice of a user, and the approach target includes an uttering user that emits the uttered voice.

(6)

The information processor according to any one of (1) to (5), in which the approach target includes a moving body, a fixed object, or a position identified by the voice recognition processing on the basis of a uttered voice of a user.

(7)

The information processor according to any one of (1) to (6), in which the operation control unit controls the motion of the autonomous mobile body on the basis of a noise map indicating circumstances under which the non-target sound is generated in a surrounding environment.

(8)

The information processor according to (7), in which the noise map includes information of a noise source that emits the non-target sound, and the operation control unit controls the motion of the autonomous mobile body on the basis of an avoidance priority of the noise source.

(9)

The information processor according to (8), in which the avoidance priority of the noise source is determined on the basis of a type of the noise source.

(10)

The information processor according to (8), in which the avoidance priority of the noise source is determined on the basis of an influence degree of the non-target sound emitted by the noise source on the voice recognition processing.

(11)

The information processor according to (10), in which the influence degree is calculated on the basis of at least one of an index indicating a degree of sound likelihood of the non-target sound or an index indicating a degree of stationarity.

(12)

The information processor according to any one of (7) to (10), in which in a case where the target sound is not detected, the operation control unit controls the motion of the autonomous mobile body to avoid input of the non-target sound on the basis of the noise map.

(13)

The information processor according to any one of (7) to (12), in which in a case where the target sound is not detected, the operation control unit limits a movement range of the autonomous mobile body within a region where the input level of the non-target sound is equal to or lower than a threshold value, on the basis of the noise map.

(14)

The information processor according to any one of (7) to (13), further including a surrounding environment estimation unit that creates the noise map.

(15)

The information processor according to (14), in which the surrounding environment estimation unit creates the noise map on the basis of direction estimation of a noise source that emits the non-target sound, or sound pressure measurement.

(16)

The information processor according to (14) or (15), in which the surrounding environment estimation unit dynamically updates the noise map on the basis of the non-target sound collected.

(17)

The information processor according to (16), in which the surrounding environment estimation unit dynamically updates the noise map on the basis of change in number, position, or sound pressure of the noise sources that emit the non-target sound.

(18)

The information processor according to (16) or (17), in which the surrounding environment estimation unit creates or updates the noise map on the basis of the non-target sound collected in a time zone where a user exists in a surrounding environment.

(19)
An information processing method including causing a processor to:
control a motion of an autonomous mobile body acting on the basis of recognition processing,
the controlling further including, in a case where a target sound that is a target voice for voice recognition processing is detected, moving the autonomous mobile body to a position, around an approach target, where an input level of a non-target sound that is not the target voice becomes lower, the approach target being determined on the basis of the target sound.

(20)
A program that causes a computer to function as an information processor, the information processor including
an operation control unit that controls a motion of an autonomous mobile body acting on the basis of recognition processing,
in a case where a target sound that is a target voice for voice recognition processing is detected, the operation control unit moving the autonomous mobile body to a position, around an approach target, where an input level of a non-target sound that is not the target voice becomes lower, the approach target being determined on the basis of the target sound.

REFERENCE NUMERALS LIST

10: autonomous mobile body
110: input unit
120: recognition unit
130: surrounding environment estimation unit
140: surrounding environment holding unit
150: operation control unit
160: drive unit
170: output unit

The invention claimed is:
1. An information processor comprising:
circuit configured to:
control a motion of an autonomous mobile body acting on a basis of recognition processing,
in a case where a target sound that is a target voice for voice recognition processing is detected, move the autonomous mobile body to a position, around an approach target, where an input level of a non-target sound that is not the target voice becomes lower, the approach target being determined on a basis of the target sound;
control the motion of the autonomous mobile body on a basis of a noise map of a region surrounding the autonomous mobile body, the region including at least a subregion that includes an indication of a presence of the non-target sound and the indication includes information of a noise source that emits the non-target sound; and
control the motion of the autonomous mobile body on a basis of an avoidance priority of the noise source.

2. The information processor according to claim 1, wherein in a response to the target sound detected, the circuitry is further configured to set the position where an input level of the target sound becomes higher and the input level of the non-target sound becomes lower.

3. The information processor according to claim 1, wherein in response to the target sound detected, the circuitry is further configured to set the position farther away from the noise source that emits the non-target sound and closer to the approach target.

4. The information processor according to claim 1, wherein in response to the target sound detected, the circuitry is further configured to move the autonomous mobile body to a side opposite to the noise source that emits the non-target sound with respect to the approach target as a center.

5. The information processor according to claim 1, wherein
the target sound includes an uttered voice of a user, and
the approach target includes an uttering user that emits the uttered voice.

6. The information processor according to claim 1, wherein the approach target includes a moving body, a fixed object, or a position identified by the voice recognition processing on a basis of an uttered voice of a user.

7. The information processor according to claim 1, wherein the avoidance priority of the noise source is determined on a basis of a type of the noise source.

8. The information processor according to claim 1, wherein the avoidance priority of the noise source is determined on a basis of an influence degree of the non-target sound emitted by the noise source on the voice recognition processing.

9. The information processor according to claim 8, wherein the influence degree is calculated on a basis of at least one of an index indicating a degree of sound likelihood of the non-target sound or an index indicating a degree of stationarity.

10. The information processor according to claim 1, wherein in a case where the target sound is not detected, the circuitry is further configured to control the motion of the autonomous mobile body to avoid input of the non-target sound on a basis of the noise map.

11. The information processor according to claim 1, wherein in a case where the target sound is not detected, the circuitry is further configured to limit a movement range of the autonomous mobile body within a region where the input level of the non-target sound is equal to or lower than a threshold value, on the basis of the noise map.

12. An information processor comprising:
circuitry configured to:
collect sounds of a region surrounding an autonomous mobile body;
create a noise map on a basis of non-target sounds collected from the region, the region including at least a subregion that includes an indication of a presence of at least one non-target sound and the indication includes information of a noise source that emits the at least one non-target sound;
dynamically update the noise map on a basis of the non-target sounds collected from the region;
control the motion of the autonomous mobile body on a basis of the noise map and on a basis of an avoidance priority of the noise source;
control a motion of an autonomous mobile body acting on a basis of recognition processing; and
in a case where a target sound that is a target voice for voice recognition processing is detected, move the autonomous mobile body to a position, around an approach target, where an input level of the at least one non-target sound becomes lower, the approach target being determined on a basis of the target sound.

13. The information processor according to claim 12, wherein the noise map is created on a basis of direction estimation of the noise source that emits the at least one non-target sound, or sound pressure measurement.

14. The information processor according to claim 12, wherein the noise map is dynamically updated on a basis of change in number, position, or sound pressure of the noise source that emits the at least one non-target sound.

15. The information processor according to claim 12, wherein the circuitry creates or updates the noise map on a basis of the at least one non-target sound collected during a time period in which a user exists in a surrounding environment.

16. A non-transitory computer readable medium, which when executed on a computer, causes the computer to
control a motion of an autonomous mobile body acting on a basis of recognition processing;
in a case where a target sound that is a target voice for voice recognition processing is detected, move the autonomous mobile body to a position, around an approach target, where an input level of a non-target sound that is not the target voice becomes lower, the approach target being determined on a basis of the target sound;
control the motion of the autonomous mobile body on a basis of a noise map of a region surrounding the autonomous mobile body, the region including at least a subregion that includes an indication of a presence of the non-target sound and the indication includes information of a noise source that emits the non-target sound; and
control the motion of the autonomous mobile body on a basis of an avoidance priority of the noise source.

* * * * *